United States Patent
Asami et al.

(10) Patent No.: US 10,793,735 B2
(45) Date of Patent: Oct. 6, 2020

(54) CURABLE COMPOSITION, CURABLE INK, STORING CONTAINER, TWO-DIMENSIONAL OR THREE-DIMENSIONAL IMAGE FORMING DEVICE, TWO-DIMENSIONAL OR THREE-DIMENSIONAL IMAGE FORMING METHOD, CURED PRODUCT, PRINTED MATTER, AND ADHESIVE LABEL

(71) Applicants: Tsuyoshi Asami, Kanagawa (JP); Takao Hiraoka, Kanagawa (JP); Daisuke Nose, Tokyo (JP)

(72) Inventors: Tsuyoshi Asami, Kanagawa (JP); Takao Hiraoka, Kanagawa (JP); Daisuke Nose, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/293,743

(22) Filed: Mar. 6, 2019

(65) Prior Publication Data
US 2019/0284416 A1 Sep. 19, 2019

(30) Foreign Application Priority Data

Mar. 15, 2018 (JP) .................................. 2018-048149
Dec. 26, 2018 (JP) .................................. 2018-241994

(51) Int. Cl.
*C09D 11/38* (2014.01)
*C09D 11/322* (2014.01)
*B41M 7/00* (2006.01)

(52) U.S. Cl.
CPC ............ *C09D 11/38* (2013.01); *C09D 11/322* (2013.01); *B41M 7/0027* (2013.01); *B41M 7/0081* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 2007/0154840 | A1* | 7/2007 | Thies | C08F 283/06 |
| | | | | 430/270.1 |
| 2012/0147103 | A1* | 6/2012 | Hasegawa | C09D 11/101 |
| | | | | 347/86 |

(Continued)

FOREIGN PATENT DOCUMENTS

| JP | 62-205174 | 9/1987 |
| JP | 2007-051244 | 3/2007 |

(Continued)

OTHER PUBLICATIONS

Imoto Minoru, "Basic Theory of Gluing, Macromolecule Publication Meeting", 1989, pp. 89-103.
(Continued)

*Primary Examiner* — Manish S Shah
(74) *Attorney, Agent, or Firm* — Oblon, McClelland, Maier & Neustadt, L.L.P.

(57) ABSTRACT

A curable composition is provided comprising at least one monomer comprising a multifunctional monomer. Each monomer has a solubility parameter (SP) of from 7 to 11 $(cal/cm^3)^{0.5}$, and a cured film produced by curing the curable composition has a glass transition temperature of from 0° C. to 30° C.

20 Claims, 7 Drawing Sheets

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106
See application file for complete search history.

(56) References Cited

U.S. PATENT DOCUMENTS

| | | | |
|---|---|---|---|
| 2015/0077481 A1* | 3/2015 | Yoshino | C09D 11/30 347/86 |
| 2015/0232675 A1* | 8/2015 | Yoshino | C09D 11/322 347/86 |
| 2016/0257831 A1* | 9/2016 | Hirade | B29C 64/129 |
| 2016/0264795 A1 | 9/2016 | Asami et al. | |
| 2016/0369116 A1* | 12/2016 | Iio | C08F 2/48 |
| 2017/0114233 A1 | 4/2017 | Asami et al. | |
| 2017/0137643 A1 | 5/2017 | Hirade et al. | |
| 2017/0204282 A1* | 7/2017 | Illsley | C09D 4/06 |
| 2017/0253680 A1 | 9/2017 | Yamada | |
| 2017/0327705 A1 | 11/2017 | Yamada | |

FOREIGN PATENT DOCUMENTS

| | | |
|---|---|---|
| JP | 2008-087248 | 4/2008 |
| JP | 2011-122063 | 6/2011 |
| JP | 2012-140593 | 7/2012 |
| JP | 2016-069478 | 5/2016 |
| JP | 2017-160355 | 9/2017 |

OTHER PUBLICATIONS

Robert F. Fedors, "A Method for Estimating Both the Solubility Parameters and Molar Volumes of Liquids", Polymer Engineering and Science, Feb. 1974, vol. 14, No. 2, 147-154.

* cited by examiner

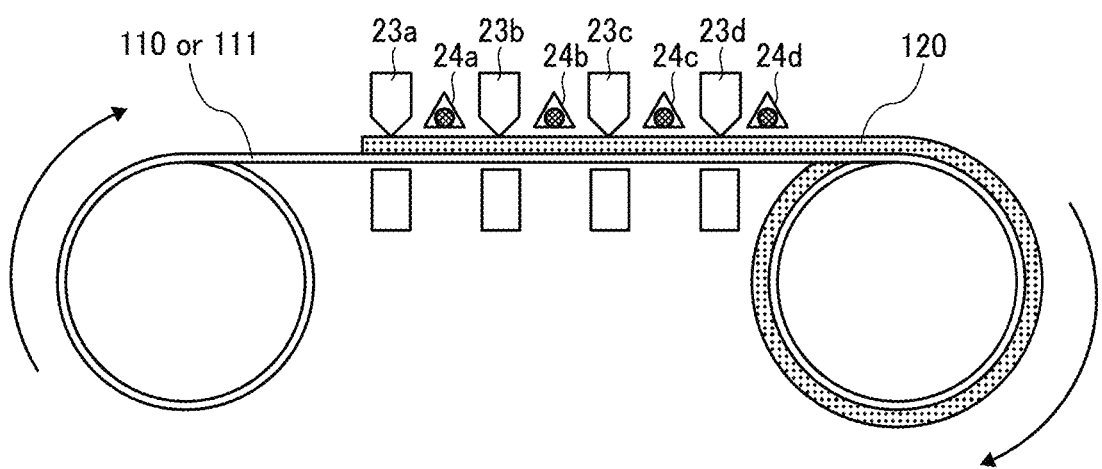

CURABLE COMPOSITION, CURABLE INK, STORING CONTAINER, TWO-DIMENSIONAL OR THREE-DIMENSIONAL IMAGE FORMING DEVICE, TWO-DIMENSIONAL OR THREE-DIMENSIONAL IMAGE FORMING METHOD, CURED PRODUCT, PRINTED MATTER, AND ADHESIVE LABEL

CROSS-REFERENCE TO RELATED APPLICATIONS

This patent application is based on and claims priority pursuant to 35 U.S.C. § 119(a) to Japanese Patent Application Nos. 2018-048149 and 2018-241994, filed on Mar. 15, 2018 and Dec. 26, 2018, respectively, in the Japan Patent Office, the entire disclosure of each of which is hereby incorporated by reference herein.

BACKGROUND

Technical Field

The present disclosure relates to a curable composition, a curable ink, a storing container, a two-dimensional or three-dimensional image forming device, a two-dimensional or three-dimensional image forming method, a cured product, a printed matter, and an adhesive label.

Description of the Related Art

It is known that a curable composition that is curable by ultraviolet rays or the like has less odor and dries faster compared to a composition containing an organic solvent, and thus, preferably recorded on a non-ink-absorptive substrate.

Recently, the applications of curable compositions have been expanding, and a curable composition has been desired which forms a cured film that does not easily change the properties even under severe environmental conditions.

However, in the case of use in an environment having a high humidity or an environment exposed to moisture, moisture becomes impregnated inside the cured film, and it is difficult to suppress the deterioration of the cured film.

SUMMARY

An embodiment of the present invention provides a curable composition comprising at least one monomer comprising a multifunctional monomer. Each monomer has a solubility parameter (SP) of from 7 to 11 $(cal/cm^3)^{0.5}$, and a cured film produced by curing the curable composition has a glass transition temperature of from 0° C. to 30° C.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 10 is a schematic view of an image forming device of the present disclosure when winding a continuous adhesive label having an adhesive, FIG. 11 is a diagram showing the evaluation rankings of Class 0 to Class 5 in the JIS K5600 Cross-cut evaluation ranking.

Figure 1:
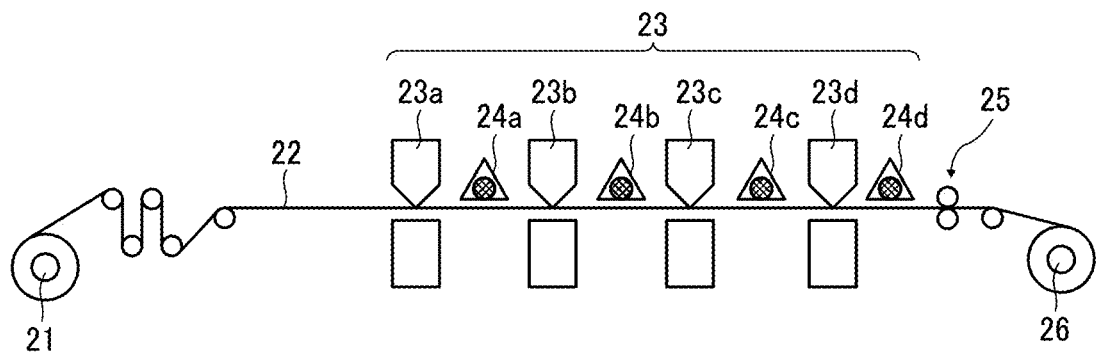
FIG. 1 is a schematic view illustrating an example of an image forming device of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

One aspect of the present invention is a curable composition which provides a cured film having an excellent adhesion to a protective layer and a label substrate and an excellent water resistance.

As the result of repeated intensive studies, the present inventors discovered the following.

An ultraviolet ray curable ink for an inkjet comprising an amine-modified acrylate and an isocyanurate has been proposed in attempting to improve the water resistance. Further, an active energy ray-curable composition comprising a polycyclic epoxy compound has been proposed. Furthermore, an ultraviolet curable inkjet ink comprising a monofunctional acrylic monomer having a glass transition temperature (Tg) of less than 20° C. and a monofunctional monomer having a Tg of 20° C. or more has been proposed in attempting to improve flexibility.

However, these curable compositions have insufficient water resistance and therefore, when the cured film contains water, the adhesion between the cured film and the substrate decreases, the color of the cured film changes.

Further, an ultraviolet curable printing ink composition for laminate has been proposed for providing a protective layer by a laminate on a cured film surface, in attempting to reduce the contact between the cured film and water and to reduce the change in the cured film. Further, a manufacturing method of a molded printed matter has been proposed in which an ink composition is irradiated with an active radiation to cure and subjected to lamination processing.

However, it is difficult to attain a complete waterproof state even if a protective layer is provided by the laminate as above, and the cured film becomes discolored when the cured film itself does not have water resistance to a certain extent. Further, the adhesion between the cured film and the protective layer is insufficient.

The inventors of the present invention discovered a curable composition comprising at least one monomer comprising a multifunctional monomer, where each monomer has a solubility parameter (SP) of from 7 to 11 $(cal/cm^3)^{0.5}$, and a cured film produced by curing the curable composition has a glass-transition temperature (below, referred to as "Tg") of from 0° C. to 30° C.

Upon curing, the multifunctional monomer forms a cross-linked structure and a network. Therefore, the inside of the cured film of the curable composition comprising the multifunctional monomer becomes dense, and the strength of the cured film can improve.

As the Tg of the cured film is 0° C. to 30° C., the cured film has an adhesive property, and thus, the adhesion can be controlled.

When the content of the multifunctional monomer is low, there are numerous gaps in the network of the cross-linked structure formed by the cured multifunctional monomer where water can easily enter, thus, the water resistance of the cured film decreases. By contrast, when the content of the multifunctional monomer is high, the network of the cross-linked structure formed by the cured multifunctional monomer becomes fine, and the cured film becomes too hard, thus, the flexibility of the cured film is insufficient.

The Tg of the cured film tends to reflect the product of Tg of the respective homopolymers of the monofunctional monomer and the multifunctional monomer and the respective contents thereof. The lower the amount of the multifunctional monomer in the cured film, the smaller that the cross-linked structure inside the cured film, thus, this tendency is more likely to be reflected.

Therefore, the inventors of the present invention discovered that, by making the curable composition as described above, the adhesion between the cured film and the protective layer and the label substrate, and the water resistance are made excellent.

The curable composition of the present disclosure may include a thermosetting composition, an active energy ray-curable composition, and the like, and the active energy ray-curable composition is more suitable.

(Curable Composition)

The curable composition comprises at least one monomer comprising a multifunctional monomer, where each monomer has an SP of from 7 to 11 $(cal/cm^3)^{0.5}$, and a cured film produced by curing the curable composition has a Tg of from 0° C. to 30° C. The curable composition preferably comprises a monofunctional monomer, a polymerizable oligomer, a pigment, a pigment dispersant, a polymerization initiator, and a polymerization accelerator, and further optionally comprises other components in accordance with need.

The curable composition is preferably cured by light having an emission peak in the range from 360 to 400 nm.

The Tg of the cured film produced by curing the curable composition is from 0° C. to 30° C. When the Tg of the cured film produced by curing the curable composition is 0° C. or more, the strength of the cured film improves. When the Tg of the cured film produced by curing the curable composition is 30° C. or less, the adhesive property improves, thus, the laminate adhesion and the substrate adhesion in the adhesive label can improve.

Note that, in the present disclosure, "the Tg of the cured film" means the Tg of the entire film resulted from a polymerization of the monomer contained in the curable composition, and also a curing thereof in the presence of components other than the monomer such as a pigment contained in the curable composition.

The Tg of the cured film produced by curing the curable composition can be obtained by, for example, subjecting the cured film to a measurement by a differential scanning calorimeter (DSC) or a thermomechanical analyzer (TMA).

The measurement can be performed with, for example, the cured film with a thickness of 20 μm.

In the cured film produced by curing the curable composition, the water absorption rate shown by the following Formula (1) is preferably 5% by mass or less.

$$\text{Water absorption rate of the cured film (\% by mass)} = \frac{\text{Mass of the cured film increased due to water absorption (g)}}{\text{Mass of the cured film prior to water absorption (g)}} \times 100 \quad \text{Formula (1)}$$

When the water absorption rate is 5% by mass or less, the discoloration caused by water can be suppressed, and the water resistant adhesion can be improved.

The water absorption rate of the cured film can be obtained from the weight of the cured film immersed in hot water of 40° C. for one day based on an evaluation method in accordance with the water absorption test described in "5.4 (3) Method for calculating the water absorption rate" of the specification of JIS (Japanese Industrial Standard) A5208.

<Multifunctional Monomer>

The curable composition comprises at least one monomer comprising a multifunctional monomer, and each monomer has an SP of from 7 to 11 $(cal/cm^3)^{0.5}$.

When the SP of each monomer is 7 $(cal/cm^3)^{0.5}$ or more, the dispersibility of a pigment in the curable composition, and the solubility of the polymerization initiator and the polymerization inhibitor in the curable composition are excellent. When the SP of each monomer is 11 $(cal/cm^3)^{0.5}$ or less, the hydrophilicity of the cured film becomes low, and the water resistance of the cured film can be improved.

The SP is a numerical expression which indicates the ease at which substances dissolve in each other, and is an intrinsic physical property value of the monomer unit contained in the curable composition. The SP is represented by an attracting force between molecules, that is, square root of the cohesive energy density (CED). Note that, the CED is an energy quantity required for the evaporation of 1 mL of a substance.

The SP can be calculated using the following Formula (i) by the Fedors method.

$$SP=(CED)^{1/2}=(E/V)^{1/2} \quad \text{Formula (i)}$$

In Formula (i), E denotes a molecular cohesive energy (cal/mol), and V denotes a molecular volume (cm³/mol), and are respectively represented by the following Formula (ii) and Formula (iii) when Δei denotes an evaporation energy of an atomic group and Δvi denotes a molar volume.

$$E=\Sigma\Delta ei \quad \text{Formula (ii)}$$

$$V=\Sigma\Delta vi \quad \text{Formula (iii)}$$

There are various methods for calculating the SP. In the present disclosure, the SP is calculated according to the commonly used Fedors' method.

In the calculation method, the data described in "Basic Theory of Gluing" (Minoru IMOTO, chapter 5, published by Highpolymer Publication (Kobunshi Kankokai)) can be used as the various data such as the evaporation energy Δei of each atom group, and the molar volume Δvi.

Further, with regard to the data not described in the aforementioned publication, such as that for —$CF_3$ group, refer to R. F. Fedors, Polym. Eng. Sci. 14, 147 (1974).

Note that, for reference, the SP shown by Formula (i) is converted to have a unit of $(J/cm^3)^{1/2}$ or an SI unit of $(J/m^3)^{1/2}$ by being multiplied by 2.046 or 2.046, respectively.

Specific examples of the multifunctional monomer having an SP of from 7 to 11 $(cal/cm^3)^{0.5}$ include, but are not limited to, 1,9-nonanediol diacrylate (SP: 9.8 $(cal/cm^3)^{0.5}$), diethylene glycol diacrylate (SP: 9.8 $(cal/cm^3)^{0.5}$), 1,6-hexanediol diacrylate (SP: 10.0 $(cal/cm^3)^{0.5}$), dipropylene glycol diacrylate (SP: 10.1 $(cal/cm^3)^{0.5}$), trimethylolpropane triacrylate (SP: 10.4 $(cal/cm^3)^{0.5}$), and pentaerythritol tetraacrylate (SP: 10.5 $(cal/cm^3)^{0.5}$).

The content of the multifunctional monomer is preferably from 1% by mass to 20% by mass relative to the total amount of the curable composition, and is more preferably from 1% by mass to 5% by mass for the stretchability. When the content of the multifunctional monomer is 1% by mass or more, the cross-linked structure is formed within the curable composition, thus, the water resistance and the strength of the cured film improve. Further, when the content of the multifunctional monomer is 20% by mass or less, the stretchability improves. Further, the formability also improves in stretch-molding applications.

<Monofunctional Monomer>

The curable composition preferably comprises a monofunctional monomer, and each monomer has an SP of from 7 to 11 $(cal/cm^3)^{0.5}$.

When the SP of each monomer is 7 $(cal/cm^3)^{0.5}$ or more, the dispersibility of the pigment in the curable composition, and the solubility of the polymerization initiator and the polymerization inhibitor in the curable composition are excellent. When the SP of each monomer is 11 $(cal/cm^3)^{0.5}$ or less, the hydrophilicity of the cured film becomes low, and the water resistance of the cured film can improve.

The SP of the monofunctional monomer can be obtained by the same method as the SP of the multifunctional monomer.

The monofunctional monomer having an SP of from 7 to 11 $(cal/cm^3)^{0.5}$ is not particularly limited. It can suitably be selected to a particular application. Examples thereof include, but are not limited to, stearyl acrylate (SP: 8.7 $(cal/cm^3)^{0.5}$), isobornyl acrylate (SP: 8.7 $(cal/cm^3)^{0.5}$), lauryl acrylate (SP: 8.9 $(cal/cm^3)^{0.5}$), isoamyl acrylate (SP: 9.0 $(cal/cm^3)^{0.5}$), tetrahydrofurfuryl acrylate (SP: 9.4 $(cal/cm^3)^{0.5}$), cyclic trimethylolpropane formal acrylate (SP: 9.5 $(cal/cm^3)^{0.5}$), formalized-trimethylolpropane monoacrylate (SP: 9.5 $(cal/cm^3)^{0.5}$), cyclohexyl acrylate (SP: 9.6 $(cal/cm^3)^{0.5}$), benzyl acrylate (SP: 10.1 $(cal/cm^3)^{0.5}$), and phenoxyethyl acrylate (SP: 10.1 $(cal/cm^3)^{0.5}$).

Thereamong, a monofunctional monomer which binds to an acryloyl group by an ether bond and has a ring structure is preferable. When the curable composition includes a monofunctional monomer having a ring structure, the strength of the cured film can improve and the water resistance can improve.

Specific examples of the monofunctional monomer having a ring structure include, but are not limited to, tetrahydrofurfuryl acrylate (SP: 9.4 $(cal/cm^3)^{0.5}$), cyclic trimethylolpropane formal acrylate (SP: 9.5 $(cal/cm^3)^{0.5}$), cyclohexyl acrylate (SP: 9.6 $(cal/cm^3)^{0.5}$), and benzyl acrylate (SP: 10.1 $(cal/cm^3)^{0.5}$).

Specific examples of the monofunctional monomer which binds to an acryloyl group by an ether bond and has a ring structure include, but are not limited to, cyclic trimethylolpropane formal acrylate, cyclohexyl acrylate, and benzyl acrylate.

[Saturation Concentration of Water in Each Monomer]

The saturation concentration of water in each monomer is preferably 3% by mass, and more preferably 1% by mass or less, at 25° C. When the saturation concentration of water in each monomer is 3% by mass or less, the water resistance of the cured film can improve.

The saturation concentration of water in each monomer can be measured as follows. First, 0.25% by mass of pure water is added, in a 25° C. environment, to each multifunctional monomer and each monofunctional monomer. The content of water contained by the multifunctional monomer and the monofunctional monomer is measured, and the water content at which the water content no longer changes even if pure water in excess of a certain amount is added is deemed to be the saturation concentration of water in each monomer. Note that, when water in an amount exceeding the saturation content was added, the monomer may be separated or precipitated.

The content of the water can be measured using, for example, a Karl Fischer moisture meter (Device name: MKA-610, manufactured by Kyoto Electronics Manufacturing Co., Ltd.) by an electric field method under the heating temperature of 150° C. and the $N_2$ purge flow of 200 mL/minute.

The monofunctional monomer having a saturation concentration of water at 25° C. of 3% by mass or less is not specifically limited, and can be appropriately selected in accordance with the purpose. Specific examples thereof include, but are not limited to, a hydrophobic monomer which does not have a hydrophilic group. Further, specifically, stearyl acrylate (saturation concentration of water: 0.6% by mass), isobornyl acrylate (saturation concentration of water: 0.8% by mass), lauryl acrylate (saturation concentration of water: 0.7% by mass), isoamyl acrylate (saturation concentration of water: 0.7% by mass), tetrahydrofurfuryl acrylate (saturation concentration of water: 0.9% by mass), cyclic trimethylolpropane formal acrylate (saturation concentration of water: 1.7% by mass), formalized trimethylolpropane monoacrylate (saturation concentration of water: 1.9% by mass), cyclohexyl acrylate (saturation concentration of water: 0.8% by mass), benzyl acrylate (saturation concentration of water: 0.9% by mass), and phenoxyethyl acrylate (saturation concentration of water: 1.1% by mass) may be used.

The saturation concentration of water in each monomer can be obtained from, for example, results measured by a Karl Fischer moisture meter (Device name: MKA-610, manufactured by Kyoto Electronics Manufacturing Co., Ltd.) by an electric field method under the conditions of the heating temperature of 150° C. and the $N_2$ purge flow of 200 mL/minute.

The curable composition of the present disclosure is particularly effective in applications as a curable inkjet ink.

When the cured film of the curable composition having an average thickness of 10 μm is immersed in hot water having a temperature of 40° C. for 24 hours, subsequently immersed in liquid nitrogen for at least two minutes to be frozen, transferred to a cryo stage, and processed by a focused ion beam (FIB) to obtain a cross-section, the void area ratio calculated by binarizing a scanning electron microscope (SEM) image of the cross-section of the cured film is preferably 5% or less.

By the amount of the monofunctional monomer being larger than the amount of the multifunctional monomer in the curable composition, the adhesion and the stretchability can improve. By the void area ratio calculated by binarizing the cryo-FBI cross-sectional SEM image of the cured film after the immersion being 5% or less, the water resistance is high.

It is thought that voids are produced by the water penetrating into the cured film causing the cured film to swell. Specifically, as the pigment does not react with the cured film, they are not integrated together, and voids easily occur. If voids occur, the water further penetrates into the voids, and causes discoloration.

In order to prevent voids, it is effective to use a hydrophobic monomer, and to minimize the pigment content.

When the void area ratio is 5% or less, the penetration of water is reduced and the discoloration can be prevented. When the void area ratio is more than 5%, the problems occur such as an increase of the degree of discoloration, a decrease of the strength of the film itself, and a decrease of the adhesion.

Preferably, the curable composition of the present disclosure comprises a polymerizable monomer comprising the monofunctional monomer and the multifunctional monomer, and a pigment, wherein the content of the pigment is 1% by mass to 5% by mass relative to the total amount of the curable composition.

When the content of the pigment is 1% by mass or more, a sufficient print density necessary for the image formation can be obtained. Further, when the content of the pigment is 5% by mass or less, the water resistance properties become good. The pigment dispersant is adsorbed to the periphery of the pigment and voids easily form in the vicinity of the pigment. The monomer and the oligomer are integrated by the reaction, but the pigment and the pigment dispersant do not contain reactive groups which react with the monomer, and when the coated film swells due to the water, voids easily form in the vicinity of the pigment. Therefore, the content of the pigment is 5% by mass or less relative to the total amount of the curable composition, and it is preferable that the content of the pigment is as low as possible as long as the print density can be secured.

The content of the multifunctional monomer is preferably 1% by mass to 20% by mass relative to the total amount of the curable composition.

When the content is 1% by mass or more, the crosslink structure can sufficiently form, and the water resistance and the film strength improve. Further, when the content is 20% by mass or less, the stretchability improves and the formability becomes good in stretch-molding applications. In the case of an application for which a high stretchability is sought, the content of the multifunctional monomer is more preferably 1% by mass to 5% by mass.

The skin irritation (P.I.I.) of the monomer is preferably 1.0 or less. When the skin irritation of the monomer is 1.0 or less, the irritation to the skin can be reduced, thus, the safety can improve.

The color (brightness) of the monomer is preferably a color having a Gardner gray scale of 2 or less, and is more preferably colorless and transparent. When the color of the monomer is a color having a Gardner gray scale of 2 or less, it is possible to prevent the color (hue and saturation) of the curable composition exhibited by the pigment from changing due to mixing of the monomer in the curable composition.

The Gardner gray scale can be measured by, for example, a method according to the specification of JIS K0071-2 Testing methods for color of chemical products. Part 2: Gardner color scale.

The content of the monomer is preferably from 50% by mass to 90% by mass, and more preferably from 65% by mass to 85% by mass, relative to the entirety of the curable composition.

<Polymerizable Oligomer>

An oligomer is defined as a polymer having from 2 to 20 repeating monomer structural units.

The polymerizable oligomer preferably has one or more ethylenically unsaturated double bonds.

The polymerizable oligomer is not specifically limited, and can be appropriately selected in accordance with the purpose. Specific examples of the polymerizable oligomer include, but are not limited to, urethane acrylate oligomers, epoxy acrylate oligomers, polyester acrylate oligomers, and special oligomers.

Specific examples of the urethane acrylate oligomer include, but are not limited to, aromatic urethane acrylate oligomers and aliphatic urethane acrylate oligomers. These may be used singly or in combinations of two or more.

The number of unsaturated carbon-carbon bonds in the polymerizable oligomer is preferably from 2 to 5, and more preferably 2. When the number of unsaturated carbon-carbon bonds in the polymerizable oligomer is from 2 to 5, a good curability can be obtained.

As the polymerizable oligomer, an appropriately synthesized product may be used, or a commercially available product may be used. Specific examples of the commercially available polymerizable oligomer include UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 (the above were manufactured by The Nippon Synthetic Chemical Industry Co., Ltd.); CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (the above were manufactured by Arkema K.K.); and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (the above were manufactured by Daicel-Cytec Co., Ltd). These may be used singly or in combinations of two or more.

The weight average molecular weight of the polymerizable oligomer is not specifically limited, and can be appropriately selected in accordance with the purpose. In terms of polystyrene, the weight average molecular weight is preferably from 1,000 to 30,000, and more preferably from 5,000 to 20,000.

The weight average molecular weight can be measured by a gel permeation chromatographic (GPC) apparatus.

The skin irritation of the polymerizable oligomer is preferably 1.0 or less. When skin irritation of the polymerizable oligomer is 1.0 or less, the irritation to the skin can be reduced, thus, the safety can improve.

The color (brightness) of the polymerizable oligomer is preferably a color having a Gardner gray scale of 2 or less, and is more preferably colorless and transparent. When the color of the polymerizable oligomer is a color having a Gardner gray scale of 2 or less, it is possible to prevent the color (hue and saturation) of the curable composition exhibited by the pigment from changing due to mixing of the monomer in the curable composition.

The Gardner gray scale can be measured by, for example, a method according to the specification of JIS K0071-2 Testing methods for color of chemical products. Part 2: Gardner color scale.

The content of the polymerizable oligomer is preferably 20% by mass or less, and more preferably 15% by mass or less, and even more preferably 8% by mass or less, and most preferably 5% by mass or less, relative to the entirety of the curable composition. When the content of the polymerizable oligomer is 20% by mass or less, an increase in the viscosity can be prevented, and the discharge stability can be improved.

<Pigment>

The pigment is not specifically limited, can be appropriately selected in accordance with the purpose, and conventionally known pigments can be used. These may be used singly or in combinations of two or more.

The pigment is preferably included in the curable composition as a pigment dispersion.

Specific examples of white pigments include, but are not limited to, white inorganic pigments.

Specific examples of the white inorganic pigments include, but are not limited to, alkaline-earth metal sulfates, alkaline-earth metal carbonates, silica, calcium silicate, alumina, alumina hydrate, titanium oxide, zinc oxide, talc, and clay.

Specific examples of the alkaline-earth metal sulfate include, but are not limited to, barium sulfate.

Specific examples of the alkaline-earth metal carbonate include, but are not limited to, calcium carbonate.

Specific examples of the silica include, but are not limited to, fine powders of silicic acid and synthetic silicate.

The pigments may be used singly or in combinations of two or more. Thereamong, titanium oxide is preferable.

Further, the white pigment preferably has a surface which has been treated with alumina or silica.

Specific examples of black pigments include, but are not limited to, carbon black.

The carbon black is preferably an oxidized carbon black having a primary particle diameter from 35 to 60 nm, a dibutyl phthalate (DBP) absorption amount from 35 to 55 (g/100 g), and a pH of 3.5 or less.

Specific examples of yellow pigments include, but are not limited to, C.I. Pigment Yellow 74, C.I. Pigment Yellow 155, and C.I. Pigment Yellow 180.

The surface of the yellow pigment is preferably treated with an acid for the dispersion stability. By treating the surface of the yellow pigment with an acid, a basic high-molecular-weight dispersant is easily adsorbed, which can result in improvement of the dispersion stability by the steric repulsion effect.

Specific examples of cyan pigments include, but are not limited to, phthalocyanine pigments.

Specific examples of the phthalocyanine pigments include, but are not limited to, C.I. Pigment Blue 15:3 and C.I. Pigment Blue 15:4. Thereamong, C.I. Pigment Blue 15:4 is preferable for the color characteristics, the dispersion stability, and the weatherability.

The surface of the cyan pigment is preferably treated with an acid for the dispersion stability. By treating the surface of the cyan pigment with an acid, the basic high-molecular-weight dispersant is easily adsorbed, which can result in improvement of the dispersion stability by the steric repulsion effect.

Specific examples of magenta pigments include, but are not limited to, quinacridone pigments.

Specific examples of the quinacridone pigments include, but are not limited to, C.I. Pigment Red 122, C.I. Pigment Violet 19, and C.I. Pigment Red 202. Thereamong, C.I. Pigment Red 122 is preferable for the color characteristics and the weatherability. These may be used singly or in combinations of two or more. Further, a mixed crystal pigment may also be used.

The surface of the magenta pigment is preferably treated with an acid for the dispersion stability. By treating the surface of the magenta pigment with an acid, a basic high-molecular-weight dispersant is easily adsorbed, which can result in improvement of the dispersion stability by the steric repulsion effect.

The content of the white pigment is preferably from 8% by mass to 20% by mass relative to the entirety of the curable composition. When the content of the white pigment is 8% by mass or more, the hiding power can improve. Further, when the content of the white pigment is 20% by mass or less, the discharge stability can improve.

The content of pigments other than the white pigment is preferably from 2% by mass to 8% by mass relative to the entirety of the curable composition. When the content of the pigments other than the white pigment is 2% by mass or more, the color density can improve. Further, when the content of the pigments other than the white pigment is 8% by mass or less, the discharge stability can improve.

<Pigment Dispersant>

The curable composition preferably comprises a pigment dispersant. By the curable composition comprising a pigment dispersant, the dispersion of the pigment can improve.

The pigment dispersant is preferably a polymeric pigment dispersant.

The polymeric pigment dispersant is not particularly limited. It can suitably be selected to a particular application. Examples thereof include, but are not limited to, vinyl polymers, vinyl copolymers, acrylic polymers, acrylic copolymers, polyester, polyamides, polyimides, polyurethanes, and amino polymers.

Specific examples of the amino polymer include, but are not limited to, polyoxyalkylene, polyalkylene, and polyamine.

A commercially available product can be appropriately used as the polymeric pigment dispersant.

Commercially available products of polymeric pigment dispersants are not particularly limited. It can suitably be selected to a particular application. Examples thereof include, but are not limited to, the AJISPER series manufactured by Ajinomoto Fine-Techno Co., Inc., the SOLSPERSE series (SOLSPERSE 32000, etc.) manufactured by The Lubrizol Corporation, the DISPERBYK series and the BYKJET series manufactured by BYK Japan KK, and the DISPARLON series manufactured by Kusumoto Chemicals, Ltd.

[Saturation Concentration of Water in Each Pigment Dispersant]

The saturation concentration of water in each pigment dispersant is preferably 3% by mass or less, and more preferably 1% by mass or less, at 25° C. When the saturation concentration of water in each pigment dispersant is 3% by mass or less, the water resistance of the cured film can improve.

The saturation concentration of water in each pigment dispersant can be measured as follows. First, 0.25% by mass of pure water is added, in a 25° C. environment, to each pigment dispersant. The content of water contained by the pigment dispersant is measured, and the water content at which the water content no longer changes even if pure water in excess of a certain amount is added is deemed to be the saturation concentration of water in each pigment dispersant. Note that, when water in an amount exceeding the saturation content was added, the pigment dispersant may be separated or precipitated.

The content of the water can be measured using, for example, a Karl Fischer moisture meter (Device name: MKA-610, manufactured by Kyoto Electronics Manufacturing Co., Ltd.) by an electric field method under the heating temperature of 150° C. and the $N_2$ purge flow: 200 mL/minute.

Regarding the pigment dispersant contained in the curable composition or the curable ink, the saturation concentration of water in each pigment dispersant can be obtained for example, by the following method.

First, 1.5 g of a curable composition or a curable ink is weighed in a 1 mL sample holder used for centrifugal separation. Next, the weighed curable composition or curable ink is subject to a centrifugal separation at 100,000 rpm for one hour, and the supernatant was removed thereafter. After adding acetone in an amount equivalent to the amount of removed supernatant, the contents are stirred with a spatula and subject to centrifugal separation four times in the same manner as above. Next, the sample is placed in a vacuum drier after centrifugal separation and dried completely. Then, a separation extraction solvent such as methylene chloride is added, the elution component in which the pigment dispersant is contained is dried, and the pigment is separated from the pigment dispersant. The saturation concentration of water in each pigment dispersant can be obtained for the obtained pigment dispersant by the above described method which uses a Karl Fischer moisture meter.

The pigment dispersant having a saturation concentration of water at 25° C. of 3% by mass or less is not particularly limited. It can suitably be selected to a particular application. Examples thereof include, but are not limited to, hydrophobic pigment dispersants. Among the hydrophobic pigment dispersants, a reactive dispersant is preferable for integration with the cured film and the improvement of the water resistance.

The hydrophobic pigment dispersant is not particularly limited. It can be appropriately used as a commercially available product. Specific examples of the commercially available product of the hydrophobic pigment dispersant include, but are not limited to: BYK-161, BYK-116, BYK-167, BYK-2163, BYK-2164, and BYK-174 (the above were manufactured by BYK Japan KK); SOLSPERSE 32000, SOLSPERSE 28000, SOLSPERSE 36000, SOLSPERSE 39000, SOLSPERSE 41000; and SOLSPERSE X300 (the above were manufactured by The Lubrizol Corporation). These may be used singly or in combinations of two or more. Thereamong, SOLSPERSE X300 (reactive dispersion agent) is preferable for the water resistance.

The content of the pigment dispersant is preferably set to the minimum amount required to make is possible to disperse the pigment, for the water resistance. Specifically, the content of the pigment dispersant is preferably 8% by mass or less relative to the entirety of the curable composition.

<Polymerization Initiator>

The polymerization initiator is not specifically limited, and can be appropriately selected in accordance with the purpose as long as it produces an active species such as a radical or a cation by an energy, and can initiate polymerization of polymerizable compounds (e.g., multifunctional monomer, monofunctional monomer, or polymerizable oligomer). The polymerization initiator may be used singly or in combinations of two or more. Thereamong, a radical polymerization initiator is preferable.

The mechanism by which the polymerization initiator promotes the polymerization reaction in the curable composition is explained below.

Upon emission of an active energy ray such as an ultraviolet ray to the curable composition comprising the polymerization initiator, the polymerization initiator causes a hydrogen abstraction reaction, a cleavage reaction, etc., and generates a radical.

The generated radical undergoes an addition reaction with a polymerizable double bond of at least one of the multifunctional monomer, the monofunctional monomer, and the polymerizable oligomer. Radicals are further generated by the addition reaction. The addition reaction by the further generated radicals to the polymerizable double bond of at least one of other polyfunctional monomers, monofunctional monomers, and polymerizable oligomers occurs, and the polymerization reaction proceeds by repeating the generation of radicals and the addition reaction.

In the case when a benzophenone polymerization initiator is used, the reaction may be slowed down by use of only the polymerization initiator, thus, an amine sensitizer is preferably used in combination to enhance the reactivity.

By comprising an amine compound as a polymerization accelerator, there is an effect of supplying hydrogen to the polymerization initiator by the hydrogen abstraction reaction, and an effect of preventing the reaction due to the oxygen in the atmosphere.

Specific examples of the radical polymerization initiator include, but are not limited to, aromatic ketones, acylphosphine oxide compounds, aromatic onium chlorides, organic peroxides, thio compounds, hexaaryl biimidazole compounds, ketoxime ester compounds, borate compounds, azinium compounds, metallocene compounds, active ester compounds, compounds having a carbon halogen bond, and alkyl amine compounds.

Specific examples of the thio compounds include, but are not limited to, thioxanthone compounds and thiophenyl-group-containing compounds.

These may be used singly or in combinations of two or more. Thereamong, thio compounds are preferable, and a thioxanthone compound is more preferable, because they are unlikely to be inhibited by oxygen when forming a cured film.

The radical polymerization initiator is preferably selected in accordance with the wavelength property of the exposure lamp for curing such as a mercury lamp, a metal halide lamp, and a UV-LED lamp.

A commercially available product can be appropriately used as the polymerization initiator.

The commercially available polymerization initiator is not particularly limited. It can suitably be selected to a particular application. Examples thereof include, but are not limited to: IRGACURE 819, IRGACURE 369, IRGACURE 907, DarocurITX, and LUCIRIN TPO (the above were manufactured by BASF SE); and VICURE 10 and VICURE 30 (the above were manufactured by Stauffer Chemical). These may be used singly or in combinations of two or more.

A commercially available product can be appropriately used as the polymerization initiator containing the thioxanthone compound.

Specific examples of the commercially available polymerization initiator containing the thioxanthone compound include, but are not limited to, 2,4-diethylthioxanthone (Product name: Speedcure DETX, manufactured by Lambson Limited), 2-isopropylthioxanthone (Product name: Speedcure ITX, manufactured by Lambson Limited), and 2,4-diethylthioxanthone (Product name: KAYACURE DETX-S, manufactured by Nippon Kayaku Co., Ltd.).

The polymerization initiator preferably has properties such as (i) a high active energy ray absorption efficiency for curing the curable composition, (ii) a high reactivity with the multifunctional monomer and the monofunctional monomer, (iii) low levels of odor, yellowing, and toxicity, and (iv) not causing a dark reaction.

<Polymerization Accelerator>

The polymerization accelerator can be used in combination with the polymerization initiator The polymerization accelerator is not particularly limited. It can suitably be selected to a particular application. Examples thereof include, but are not limited to, amine compounds.

Specific examples of the amine compounds include, but are not limited to, ethyl p-dimethylaminobenzoate, 2-ethylhexyl p-dimethylaminobenzoate, methyl p-dimethylaminobenzoate, 2-dimethylaminoethyl benzoate, and butoxyethyl p-dimethylaminobenzoate. These may be used singly or in combinations of two or more.

The content of the polymerization accelerator is preferably 5% by mass to 20% by mass relative to the entirety of the curable composition for obtaining a sufficient curing speed.

<Other Components>

The curable composition may contain other known components in accordance with need. The other components are not specifically limited, and specific examples of the other components include, but are not limited to, polymerization inhibitors, surfactants, permeation accelerators, wetting agents (humectant), fixing agents, antifungal agents, antiseptic agents, antioxidants, ultraviolet absorbers, chelate agents, pH adjusters, and thickening agents.

—Polymerization Inhibitor—

The polymerization inhibitor is not particularly limited. It can suitably be selected to a particular application. Examples thereof include, but are not limited to, 4-methoxy-1-naphthol, methyl hydroquinone, hydroquinone, t-butyl hydroquinone, di-t-butyl hydroquinone, methoquinone, 2,2'-dihydroxy-3,3'-di(α-methylcyclohexyl)-5,5'-dimethyldiphenylmethane, p-benzoquinone, di-t-butyl diphenyl amine, 9,10-di-n-butoxyanthracene, 4,4'-[1,10-dioxo-1,10-decanediylbis(oxy)]bis[2,2,6,6-tetramethyl]-1-piperidinyloxy, p-methoxyphenol, and 2,6-di-tert-butyl-p-cresol. These may be used singly or in combinations of two or more.

The content of the polymerization inhibitor is preferably 0.005% by mass to 3% by mass relative to the entirety of the curable composition. When the content of the polymerization inhibitor is 0.005% by mass or more, the storage stability is improved, and, the increase in the viscosity in high-temperature environments can be suppressed due to the content of the polymerization inhibitor. When the content of the polymerization inhibitor is 3% by mass or less, the curability of the curable composition can improve.

—Surfactant—

The surfactant is not particularly limited. It can suitably be selected to a particular application. Examples thereof include, but are not limited to, higher-fatty-acid-based surfactants, silicone-based surfactants, and fluorine-based surfactants.

These may be used singly or in combinations of two or more.

The content of the surfactant is preferably 0.10% by mass to 3% by mass relative to the entirety of the curable composition, and more preferably 0.2% by mass to 1% by mass for the wettability and leveling properties of the curable composition. When the content of the surfactant is 0.1% by mass or more, the wettability of the curable composition can improve. When the content of the surfactant is 3% by mass or less, the curability of the curable composition can improve.

—Organic Solvent—

The curable composition may also contain an organic solvent, but an organic solvent is preferably not included if at all possible. As organic solvents have volatility, the safety is improved by the curable composition not containing an organic solvent (for example, volatile organic compound (VOC)-free solvent), and this also contributes to the prevention of environmental pollution.

Note that, "organic solvent" generally refers to a volatile organic compound (VOC), such as ether, ketone, xylene, ethyl acetate, cyclohexanone, and toluene, which are distinguished from the reactive monomers.

When it is stated that the composition "includes no" organic solvent, it means that the composition "substantially" includes no organic solvent, and the content of the organic solvent is preferably less than 0.1% by mass.

<Method for Preparation of Curable Composition>

The method for preparation of the curable composition is not limited to a specific preparation method as long as the above-described various components are used, and can be appropriately selected in accordance with the purpose. The curable composition can be prepared by, for example, putting a multifunctional monomer, a monofunctional monomer, a pigment, a pigment dispersant, and the like in a disperser such as a ball mill, a kitty mill, a disc mill, a pin mill, or a DYNO mill, dispersing and kneading them to prepare a pigment dispersion liquid, and further mixing the multifunctional monomer, the monofunctional monomer, a polymerization initiator, a polymerization inhibitor, a surfactant, and the like in the pigment dispersion liquid.

Further, a medialess disperser such as a DISPER and a homogenizer may be used.

<Energy Application Method and Energy Applicator>

The energy application method is a method for applying an energy to a curable composition to cure the curable composition.

The energy applicator applies an energy to a curable composition to cure the curable composition.

Specific examples of the energy include, but are not limited to, heat and an active energy ray. These may be used singly or in combinations of two or more. Thereamong, an active energy ray is preferable.

The active energy ray is not specifically limited as long as the energy necessary for the polymerization reaction of the multifunctional monomer, the monofunctional monomer, and the polymerizable oligomer in the curable composition can be applied, and can be appropriately selected in accordance with the purpose. Specific examples of the active energy ray include, but are not limited to, ultraviolet rays, electron beams, α-ray, β-ray, γ-ray, and X-rays. Specifically, when a high-energy light source is used, the polymerization reaction can proceed even if a polymerization initiator is not used.

The light source of the active energy ray is not particularly limited. It can suitably be selected to a particular application. Examples thereof include, but are not limited to, a mercury lamp, a metal halide lamp, a light emitting diode (LED) lamp.

Specific examples of the mercury lamp include, but are not limited to, a lamp in which a high-purity mercury or a small amount of a rare gas is inserted in a quartz glass luminous tube. The mercury lamp effectively radiates ultraviolet rays having a main wavelength of 365 nm and wavelengths of 254 nm, 303 nm, and 313 nm, and the shorter the wavelength, the higher the output can be.

Specific examples of the metal halide lamp include, but are not limited to, lamps in which mercury or a metal halide is inserted in a luminous tube. The metal halide lamp can radiate an active energy ray spectrum in a wide wavelength range of from 200 to 450 nm, and can produce a higher output than the mercury lamp at wavelengths of 300 nm to 450 nm.

Specific examples of the light emitting diode (LED) lamp include, but are not limited to, a UV-LED lamp.

Thereamong, an LED lamp is preferable for a long lifespan, a low electric power consumption, a reduced environmental load without ozone generation, and a small size.

<Use Application>

The use applications of the curable composition are not specifically limited as long as the use application is in the field where curable materials are generally used, and can be appropriately selected in accordance with the purpose. The curable composition can be applied to, for example, resins for molding, paints, adhesives, insulating materials, release agents, coating materials, sealing materials, resists, and optical materials.

Furthermore, the curable composition can be used not only as an ink for forming two-dimensional texts and images, but also as stereoscopic molding materials for forming a three-dimensional image (stereoscopic molded object).

Figure 2:
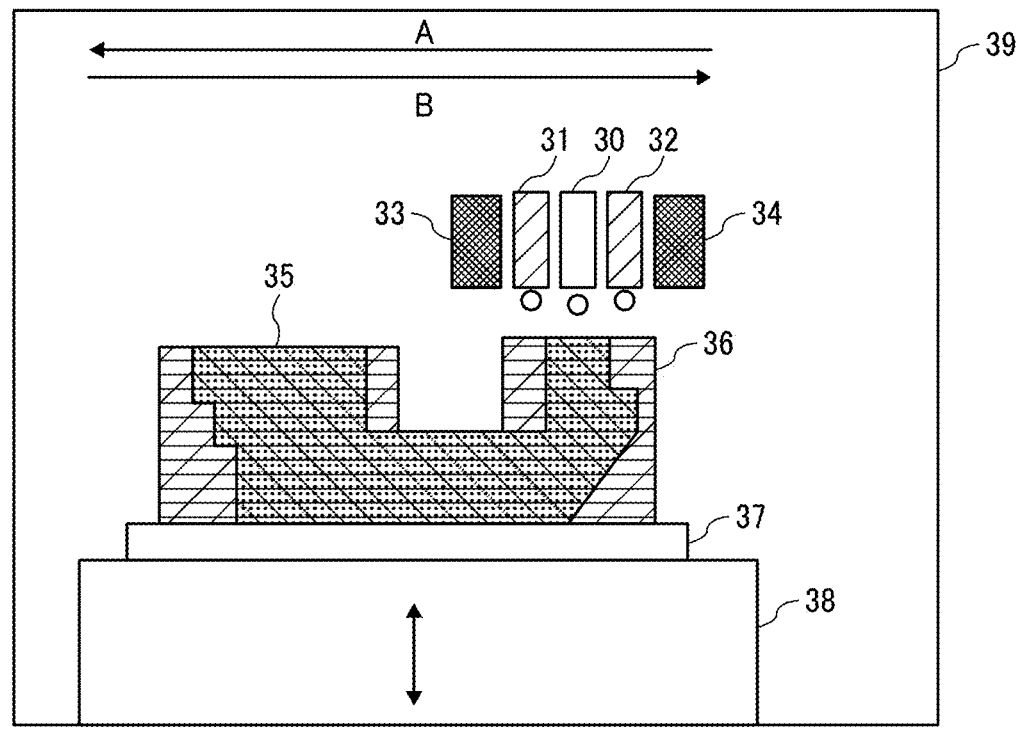
FIG. 2 is a schematic view illustrating another example of an image forming device of the present disclosure.
Figure 3A:
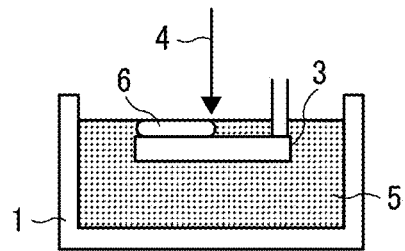
FIGS. 3A to 3D are schematic views illustrating still another example of an image forming device of the present disclosure.
Figure 3B:
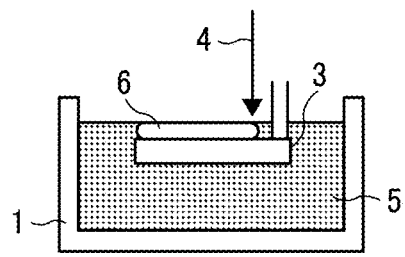
Figure 3C:
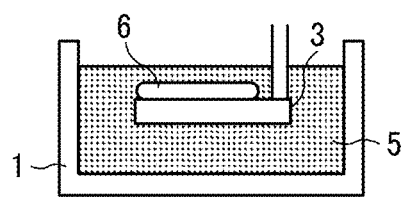
Figure 3D:
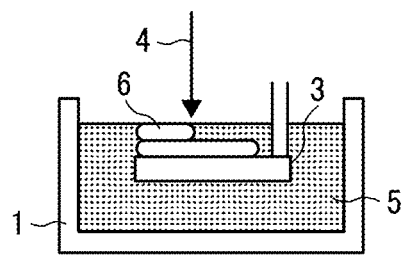

The stereoscopic molding material can be used, for example, as a binder for binding powder particles used in a powder lamination method which is one stereoscopic molding method. Further, as shown in FIG. 2, the stereoscopic molding materials can be used in a material jet method (stereolithography method) in which the curable composition is discharged to a prescribed region, irradiated with active energy rays to cure, and sequentially laminated in order to form a stereoscopic object. Furthermore, as shown in FIGS. 3A to 3D, the stereoscopic molding materials can be used in a stereolithography method in which an active energy ray 4 is emitted to a curable composition 5 in a storing pool (storing part) 1 to form a cured layer 6 having a predetermined shape on a movable stage 3, and sequentially laminating these layers to form a stereoscopic object.

(Curable Ink)

The curable ink of the present disclosure comprises a curable composition.

The curable composition contained in the curable ink is the same as the curable composition of the present disclosure.

The curable ink is preferably an ink for inkjet.

For the discharge stability, the curable ink preferably has a static surface tension of 20 to 40 mN/m, and more preferably 28 to 35 mN/m, at 25° C.

The static surface tension can be measured in an environment of 25° C. using, for example, a static surface tensiometer (Device name: CBVP-Z, manufactured by Kyowa Interface Science Co., Ltd.).

(Storing Container)

The storing container stores at least one of the curable composition and the curable ink, and refers to a container in which the curable composition is stored.

The storing container is preferred when used in the above-described use application. For example, the storing container in which the curable ink comprising the curable composition is stored can be used as an ink cartridge or an ink bottle. Therefore, there is no need to have direct contact with the ink in operations such as ink conveyance and ink replacement, and thus, it is possible to prevent the contamination of fingers and clothes. Further, it is possible to prevent entry of foreign matter such as dust into the ink.

The shape, size, and material of the storing container itself are not specifically limited, and can be appropriately selected in accordance with the purpose such as the use application and the manner of use, but a container covered with a light-blocking material or a light-blocking sheet, which does not transmit light, is preferable.

(Two-Dimensional or Three-Dimensional Image Forming Method, and Two-Dimensional or Three-Dimensional Image Forming Device)

The two-dimensional or three-dimensional image forming method of the present disclosure comprises a process for applying an energy to at least one of the curable composition and the curable ink so as to cure the at least one of the curable composition and the curable ink to form a two-dimensional or three-dimensional image, and preferably further comprises a process for discharging the curable composition or the curable ink by an inkjet recording method.

The two-dimensional or three-dimensional image forming device of the present disclosure has a storing container storing at least one of the curable composition and the curable ink and an energy applicator configured to apply an energy to the at least one of the curable composition and the curable ink to cure it, and preferably further has a discharger configured to discharge the curable composition or the curable ink by an inkjet recording method.

The two-dimensional or three-dimensional image forming method can be preferably performed by the two-dimensional or three-dimensional image forming device.

A light emitting diode light is preferable as the energy applicator.

The two-dimensional image is not particularly limited. It can suitably be selected to a particular application. Examples thereof include, but are not limited to, texts, symbols, graphics, combinations of these, and solid images.

The three-dimensional image is not particularly limited. It can suitably be selected to a particular application. Examples thereof include, but are not limited to, stereoscopic modeled objects.

The average thickness of the stereoscopic modeled objects is not specifically limited, can be appropriately selected in accordance with the purpose. Preferably, the average thickness is 10 µm or more.

A stereoscopic modeling device for forming a stereoscopic modeled object using the curable composition is not particularly limited and any known device can be used. It can suitably be selected to a particular application. Examples thereof include, but are not limited to, devices having a storing container for the curable composition, a supplier, a discharger, and an energy applicator.

The discharger is not particularly limited. It can suitably be selected to a particular application. Examples thereof include, but are not limited to, continuous injection dischargers and on-demand dischargers.

Specific examples of the one-demand dischargers include, but are not limited to, piezo dischargers, thermal dischargers, and electrostatic dischargers.

FIG. 1 is an example of an image forming device having an inkjet discharger. Each of color printing units 23*a*, 23*b*, 23*c*, and 23*d* provided with an ink cartridge having a curable ink of yellow, magenta, cyan, or black color and a discharge head discharges the ink onto a recording medium 22 supplied from a supply roller 21. Then, active energy rays are emitted from light sources 24*a*, 24*b*, 24*c*, and 24*d* to cure the inks and form color images. Then, the recording medium 22 is conveyed to a processing unit 25 and a printed matter winding roller 26. Each of the color printing units 23*a*, 23*b*, 23*c*, and 23*d* may be provided with a heater for liquefying the ink at the ink discharge part. Further, a mechanism for cooling the recording medium to room temperature by contacting or not contacting the recording medium may be provided in accordance with need. Furthermore, any inkjet recording device having a serial method which moves the head to discharge ink onto the recording medium which is intermittently moved in accordance with the discharge head width, or a line method for continuously moving the recording medium, and discharging the ink on the recording medium from a head which is maintained in a constant position can be used.

The recording medium 22 is not particularly limited. It can suitably be selected to a particular application. Examples thereof include, but are not limited to, paper, film, metal, and composite materials thereof. The recording medium 22 may be in the form of a sheet.

Furthermore, the active energy ray emission from the light sources 24*a*, 24*b*, and 24*c* may be weakened or omitted, and after printing a plurality of colors, the active energy ray from the light source 24*d* may be emitted. Energy savings and low cost can be ensured thereby.

Recorded matters include not only those printed on smooth surfaces such as normal paper and resin films, but also include recorded matter printed on irregular surfaces and recorded matter printed on surfaces consisting of various materials such as metal and ceramics. Further, by laminating two-dimensional images, a partially-stereoscopic image (image consisting of two dimensions and three dimensions) or a stereoscopic product can be formed.

FIG. 2 is a schematic view illustrating another image forming device (three-dimensional image forming device) of the present disclosure. An image forming device 39 of FIG. 2 uses a head unit (movable in the directions indicated by arrows A and B) in which inkjet heads are arranged. A first curable composition is discharged from a discharge head unit 30 for molding object, a second curable composition different in composition from the first curable composition is discharged from discharge head units 31 and 32 for support, and each of the curable compositions is cured by adjacent ultraviolet ray emitters 33 and 34 while being laminated.

More specifically, the process of discharging the second curable composition from the discharge head units 31 and 32 for support onto a modeled object support substrate 37 and irradiating with the active energy ray to solidify to form the first support layer having a reservoir and the process of discharging the first curable composition from the discharge head unit 30 for molding object to the reservoir and irradiating with the active energy ray to solidify to form the first molding object layer while lowering a stage 38 which is moveable in the vertical direction in accordance with the number of laminations are repeated, so that the support layers and the molding object layers are laminated to produce a stereoscopic modeled object 35. Then, a support layer lamination part 36 is removed in accordance with need.

Note that, in FIG. 2, only one discharge head unit 30 for molding object is provided, but two or more may be provided.

(Cured Product)

The cured product of the present disclosure has a cured layer prepared by curing at least one of the curable composition and the curable ink, and the adhesive force between the substrate and the cured layer is Class 1 or higher by a JIS K5600 cross-cut evaluation ranking.

The curable composition can be the same as the curable composition of the present disclosure.

The curable ink can be the same as the curable ink of the present disclosure.

The cured product may be a processed product obtained by stretching and processing a cured layer formed on the substrate.

The processed product is produced by, for example, subjecting the cured product or a structural body formed to a sheet shape or a film shape to a molding process such as heat stretching or punch processing, and is preferably used in applications in which molding is necessary after decorating the surface, for example, meters and operation panels of automobiles, office automation equipment, electric or electronic devices, and cameras.

The substrate is not particularly limited. It can suitably be selected to a particular application. Examples thereof include, but are not limited to, paper, plastics, metals, ceramics, glass, and composite materials thereof. Thereamong, plastics are preferable for the processability.

The cured product may include decorations. A surface decoration consisting of the cured product can be applied to the substrate as the decoration, and can be the same as the cured product.

The stretchability of the cured product at 180° C. is preferably 50% or more, and more preferably 100% or more as defined by the ratio: (length after tensile test−length before tensile test)/(length before tensile test).

(Printed Matter)

The printed matter of the present disclosure has a protective layer on the cured layer prepared by curing at least one of the curable composition and the curable ink, and the adhesive force between the cured layer and the protective layer is Class 1 or higher by a JIS K5600 cross-cut evaluation ranking.

The curable composition can be the same as the curable composition of the present disclosure.

The curable ink can be the same as the curable ink of the present disclosure.

By having a protective layer on the cured layer, the water resistance can improve. Further, when the protective layer comprises an ultraviolet absorber and the like, the light resistance can improve.

Specific examples of the protective layer include, but are not limited to, a laminate film.

Figure 4:
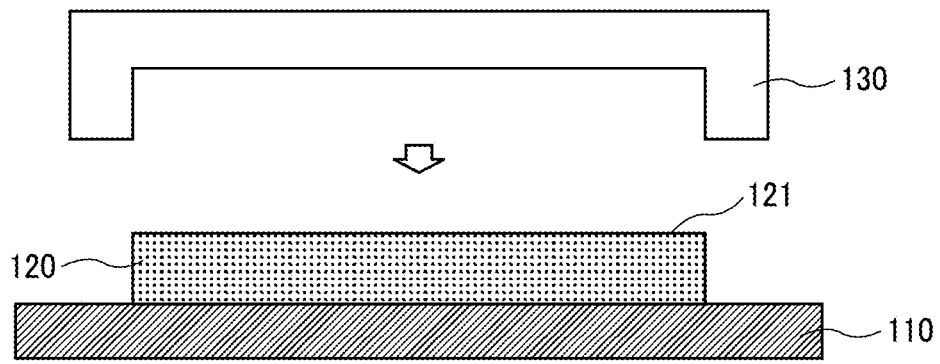
FIG. 4 is a schematic view illustrating an example of a manufacturing process of a printed matter of the present disclosure.
Figure 5:
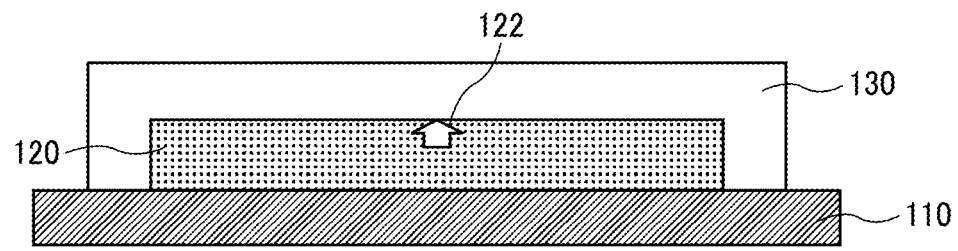
FIG. 5 is a schematic view illustrating an example of the printed matter of the present disclosure.

FIG. 4 and FIG. 5 show specific examples of the printed matter of the present disclosure. A cured layer 120 is formed by curing the curable composition of the present disclosure on a substrate 110. The cured layer 120 has an adhesive surface 121. The cured layer 120 has an adhesive property, and, has a large laminate adhesive force 122 shown in FIG. 5 and has an excellent adhesion.

A laminate film can be provided on the adhesive surface 121 as a protective layer 130. When the protective layer 130 is transparent and the substrate 110 is opaque, the cured layer 120 is visible through the transparent protective layer 130.

The substrate (for example, the substrate 110 in FIG. 4) of the printed matter is not particularly limited. It can suitably be selected to a particular application. Examples thereof include, but are not limited to, PET film, polycarbonate film, polystyrene film, polyethylene film, polypropylene film, ABS resin, metal, and glass.

The protective layer (for example, the protective layer 130 in FIG. 4) of the printed matter is not particularly limited. It can suitably be selected to a particular application. Examples thereof include, but are not limited to, polyvinyl chloride film, polycarbonate film, polystyrene film, polyethylene film, and polypropylene film.

(Adhesive Label)

The adhesive label of the present disclosure has the cured layer produced by curing at least one of the curable composition and the curable ink on the substrate, and the cured layer has an adhesive property.

The curable composition can be the same as the curable composition of the present disclosure.

The curable ink can be the same as the curable ink of the present disclosure.

The curable composition comprises at least one monomer comprising a multifunctional monomer, the SP of each monomer is from 7 to 11 $(cal/cm^3)^{0.5}$, and the Tg of the cured film produced by curing the curable composition is from 0° C. to 30° C. Therefore, the cured layer has an adhesive property, and thus, the adhesive label can be produced in which the adhesion was controlled.

Figure 6:
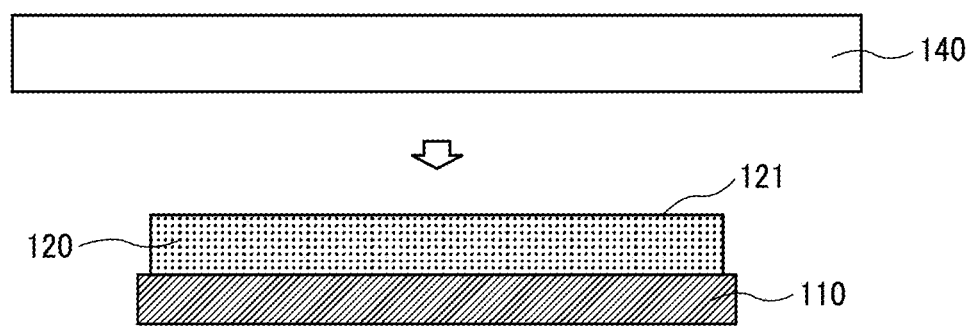
FIG. 6 is a schematic view illustrating an example of a manufacturing process of an adhesive label of the present disclosure.
Figure 7:
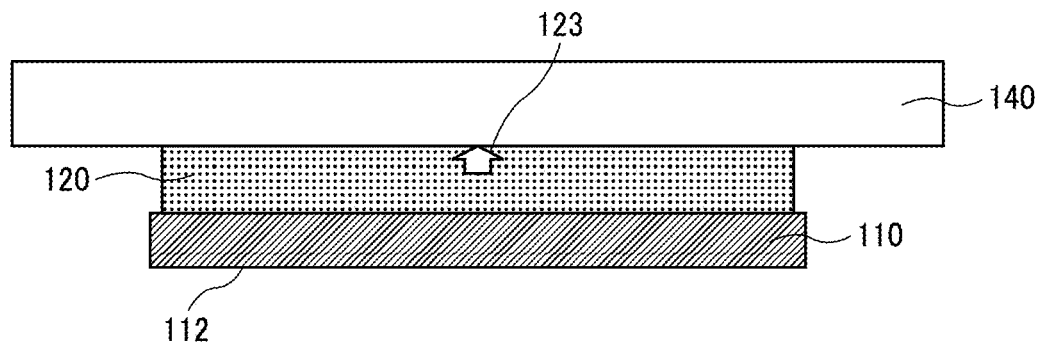
FIG. 7 is a schematic view illustrating an example of the adhesive label of the present disclosure.

FIG. 6 and FIG. 7 show specific examples of the adhesive label of the present disclosure. The cured layer 120 is formed by curing the curable composition of the present disclosure on the substrate 110. The cured layer 120 has an adhesive surface 121.

The cured layer 120 has an adhesive property, and thus, has a large label adhesive force 123 shown in FIG. 7, and has an excellent adhesion.

By making the substrate 110 opaque, and bonding a transparent substrate 140 to the adhesive surface 121, the composition can be used as the adhesive label. In this case, the cured layer 120 is visible through the transparent substrate 140.

Figure 8:
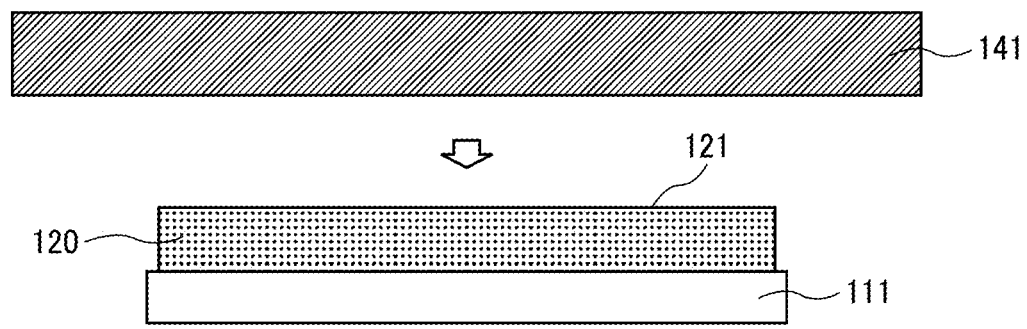
FIG. 8 is a schematic view illustrating another example of the manufacturing process of the adhesive label of the present disclosure.
Figure 9:
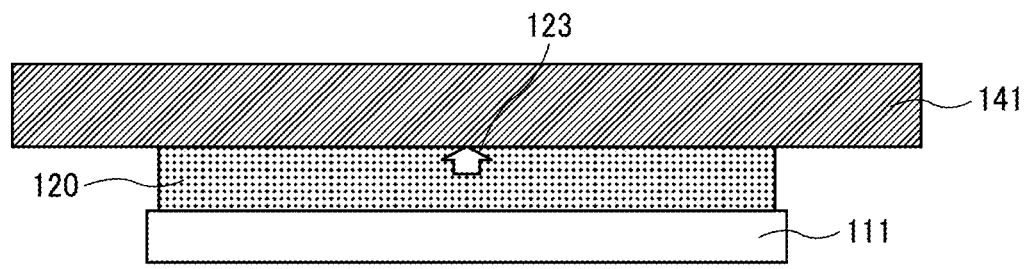
FIG. 9 is a schematic view illustrating another example of the adhesive label of the present disclosure.

FIG. 8 and FIG. 9 show another example of the adhesive label of the present disclosure. The cured layer 120 is formed by curing the curable composition of the present disclosure on a transparent substrate 111. The cured layer 120 has an adhesive surface 121. The cured layer 120 has an adhesive property, and thus, has a large label adhesive force 123 shown in FIG. 9, and has an excellent adhesion.

By bonding an opaque substrate 141 to the adhesive surface 121, the composition can be used as an adhesive label. In this case, the cured layer 120 is visible through the transparent substrate 111.

The substrate (for example, the substrate 110 in FIG. 6, and the transparent substrate 111 in FIG. 8) of the adhesive label is not particularly limited. It can suitably be selected to a particular application. Examples thereof include, but are not limited to, PET film, polycarbonate film, polystyrene film, polyethylene film, polypropylene film, and paper.

Specific examples of the paper include, but are not limited to, high quality paper and coated paper.

The substrate (for example, the transparent substrate 140 in FIG. 6, and the opaque substrate 141 in FIG. 8) bonded to the adhesive label is not particularly limited. It can suitably be selected to a particular application. Examples thereof include, but are not limited to, paper, resin film, glass, metal, ceramic, and wood.

Specific examples of the metal include, but are not limited to, aluminum.

Not only substrates having a smooth surface, but also substrates having an irregular surface may be included as the substrate.

The adhesive label has excellent adhesion and water resistance, and thus, can be used in, for example, a label adhered to the windshield of an automobile, and a label adhered to the door or mirror of a train and the like.

The surface of the substrate of the adhesive label which is opposite to the other surface having the cured layer preferably has liquid repellency. As shown in FIG. 10, in the case of winding a continuous adhesive label having a tacky surface, it is easy to peel the adhesive label without providing a release paper on the surface opposite the surface having the cured layer due to liquid repellency of the surface opposite the surface having the cured layer.

Specific examples of liquid repellency include water repellency and oil repellency.

EXAMPLES

Examples and comparative examples are shown below to further describe the present disclosure, but the present disclosure is not limited by these examples.

Note that, "the saturation concentration of water in each monomer, and the saturation concentration of water in each pigment dispersion" were measured as follows.

[Saturation Concentration of Water in Each Monomer and Saturation Concentration of Water in Each Pigment Dispersion]

For the multifunctional monomers, the monofunctional monomers, and the pigment dispersants used in Examples 1 to 6 and Comparative examples 1 to 5 shown in Tables 1 to 3 and 7, 0.25% by mass of pure water was added to each at 25° C., and the content of water respectively added to the multifunctional monomers, the monofunctional monomers, and the pigment dispersants was measured using a Karl Fischer moisture meter (Device name: MKA -610, manufactured by Kyoto Electronics Manufacturing Co., Ltd.) by an electric field method under conditions of the heating temperature of 150° C. and the $N_2$ purge flow of 200 mL/minute. The water content at which the water content did not change even if a constant amount or more of pure water was added was deemed to be the saturation concentration of water of each of the multifunctional monomer, the monofunctional monomer, and the pigment dispersant.

(Preparation of Pigment Dispersions)

<Preparation of White Pigment Dispersion A>

50.0 parts by mass of titanium oxide (Product name: JR403, manufactured by Tayca Corporation) as a white pigment, 2.0 parts by mass of a hydrophobic pigment dispersant (Product name: SOLSPERSE X300, manufactured by The Lubrizol Corporation, reactive dispersion agent, saturation concentration of water: 1.2% by mass), and 48.0 parts by mass of tetrahydrofurfuryl acrylate (manufactured by Kyoeisha Chemical Co., Ltd., SP: 9.4 $(cal/cm^3)^{0.5}$, saturation concentration of water: 1.5% by mass) were placed in a 300 mL ball mill filled with zirconia beads (diameter: 2 mm) at a filling rate of 45 volume %, and dispersed at a dispersing temperature of 25° C. and a rotation rate of 70 rpm for 200 hours to prepare a white pigment dispersion A.

<Preparation of Black Pigment Dispersion B>

15.0 parts by mass of carbon black (Product name: MOGUL-E, manufactured by Orion Engineered Carbons Co, Ltd) as a black pigment, 5.0 parts by mass of a hydrophobic pigment dispersant (Product name: BYK-167, manufactured by BYK Japan KK, saturation concentration of water: 2.8% by mass), and 80.0 parts by mass of phenoxyethyl acrylate (manufactured by Osaka Organic Chemical Industry Ltd., SP: 10.1 $(cal/cm^3)^{0.5}$, saturation concentration of water: 1.1% by mass) were placed in a 300 mL ball mill filled with zirconia beads (diameter: 2 mm) at a filling rate of 43 volume %, and dispersed at a dispersing temperature of 25° C. and a rotation rate of 70 rpm for 180 hours to prepare a black pigment dispersion B.

<Preparation of Yellow Pigment Dispersion C>

15.0 parts by mass of Pigment Yellow 155 (Product name: 4GC, manufactured by Clariant Co., Ltd) as a yellow pigment, 10.0 parts by mass of a hydrophilic pigment dispersant (Product name: BYK-9152, manufactured by BYK Japan KK, saturation concentration of water: 10% by mass or more), and 75.0 parts by mass of stearyl acrylate (manufactured by Osaka Organic Chemical Industry Ltd., SP: 8.7 $(cal/cm^3)^{0.5}$, saturation concentration of water: 0.6% by mass) were placed in a 300 mL ball mill filled with zirconia beads (diameter: 2 mm) at a filling rate of 45 volume %, and dispersed at a dispersing temperature of 25° C. and a rotation rate of 70 rpm for 200 hours to prepare a yellow pigment dispersion C.

<Preparation of Cyan Pigment Dispersion D>

15.0 parts by mass of Pigment Blue 15:4 (Product name: D7110F, manufactured by BASF SE) as a cyan pigment, 5.0 parts by mass of a hydrophilic pigment dispersant (Product name: BYK-9151, manufactured by BYK Japan KK, saturation concentration of water: 10% by mass or more), and 80.0 parts by mass of cyclic trimethylpropane formal acrylate (manufactured by Osaka Organic Chemical Industry Ltd., SP: 9.5 $(cal/cm^3)^{0.5}$, saturation concentration of water: 1.7% by mass) were dispersed at a dispersing temperature of 35° C. and a rotation speed of 5,000 rpm for 20 minutes using a homogenizer. Next, this was placed in a 1 L sand mill filled with zirconia beads (diameter: 0.3 mm) at a filling rate of 90 volume % and dispersed at a dispersing temperature of 30° C. and a rotation rate of 10 m/second for one hour to prepare a cyan pigment dispersion D.

<Preparation of Magenta Pigment Dispersion E>

15.0 parts by mass of Pigment Red 122 (Product name: RGT, manufactured by DIC Corporation) as a magenta pigment, 10.0 parts by mass of hydrophobic pigment dispersant (Product name: SOLSPERSE X300, manufactured by The Lubrizol Corporation, reactive dispersion agent, saturation concentration of water: 1.2% by mass), and 75.0 parts by mass of benzyl acrylate (manufactured by Osaka Organic Chemical Industry Ltd., SP: 10.1 $(cal/cm^3)^{0.5}$, saturation concentration of water: 0.9% by mass) were placed in a 300 mL ball mill filled with zirconia beads (diameter: 2 mm) at a filling rate of 45 volume %, and dispersed at a dispersing temperature: 25° C. and a rotation rate of 70 rpm for 96 hours to prepare a magenta pigment dispersion E.

<Preparation of Magenta Pigment Dispersion F>

A magenta pigment dispersion F was prepared in the same manner as the magenta pigment dispersion E with the exception that the pigment dispersant in the preparation of the magenta pigment dispersion E was changed to a hydrophilic pigment dispersant (Product name: BYTK-9152, manufactured by BYK Japan KK, saturation concentration of water: 10% by mass or more), and, the monofunctional monomer was changed to acryloylmorpholine (manufactured by Kohjin Film & Chemicals Co., Ltd., SP: 11.2 $(cal/cm^3)^{0.5}$, saturation concentration of water: 10% by mass or more).

The composition of each pigment dispersion A to F produced is shown in Table 1.

TABLE 1

|  |  | Pigment dispersion | | | | | |
|---|---|---|---|---|---|---|---|
|  |  | A | B | C | D | E | F |
| Pigment | White pigment (titanium oxide) | 50.0 | — | — | — | — | — |
|  | Black pigment (carbon black) | — | 15.0 | — | — | — | — |
|  | Yellow pigment (Pigment Yellow 155) | — | — | 15.0 | — | — | — |
|  | Cyan pigment (Pigment Blue 15:4) | — | — | — | 15.0 | — | — |
|  | Magenta pigment (Pigment Red 122) | — | — | — | — | 15.0 | 15.0 |

TABLE 1-continued

|  |  |  | Pigment dispersion | | | | | |
|---|---|---|---|---|---|---|---|---|
|  |  |  | A | B | C | D | E | F |
| Pigment dispersant | Hydrophoic | Product name: SOLSPERSE X300 (saturation concentration of water: 1.2% by mass) | 2.0 | — | — | — | 10.0 | — |
|  |  | Product name BYK-167 (saturation concentration of water: 2.8% by mass) | — | 5.0 | — | — | — | — |
|  | Hydrophilic | Product name: BYK-9151 (saturation concentration of water: 10% by mass or more) | — | — | — | 5.0 | — | — |
|  |  | Product name: SYK-9152 (saturation concentration of water: 10% by mass or more) | — | — | 10.0 | — | — | 10.0 |
| Monofunctional monomer |  | Stearyl acrylate (SP value: 8.7, saturation concentration of water: 0.6% by mass) | — | — | 75.0 | — | — | — |
|  |  | Tetrahydrofurfuryl acrylate (SP value: 9.4, saturation concentration of water: 1.5% by mass) | 48.0 | — | — | — | — | — |
|  |  | Cyclic trimethylolpropane formal acrylate (SP value: 9.5, saturation concentration of water: 1.7% by mass) | — | — | — | 80.0 | — | — |
|  |  | Benzyl acrylate (SP value: 10.1, saturation concentration of water: 0.9% by mass) | — | — | — | — | 75.0 | — |
|  |  | Phenoxyethyl acrylate (SP value: 10.1, saturation concentration of water: 1.1% by mass) | — | 80.0 | — | — | — | — |
|  |  | Acryloylmorpholine (SP value: 11.1, saturation concentration of water: 10% by mass or more) | — | — | — | — | — | 75.0 |
|  |  | Total (% by mass) | 100 | 100 | 100 | 100 | 100 | 100 |

<Preparation of Pigment dispersion A2>

15 parts by mass of a magenta pigment (Product name: RGT (PR 122), manufactured by DIC Corporation), 10 parts by mass of a polymerizable group-containing reactive dispersant (Product name: SOLSPERSE X300, manufactured by The Lubrizol Corporation), and 75 parts by mass of benzyl acrylate (manufactured by Osaka Organic Chemical Industry Ltd.) were placed in a 300 mL ball mill filled with zirconia beads (diameter: 2 mm) at a filling rate of 45 volume %, and dispersed at a dispersing temperature of 25° C. and a rotation rate of 70 rpm for 96 hours to prepare a Pigment dispersion A2.

<Preparation of Pigment Dispersion B2>

15 parts by mass of a cyan pigment (Product name: D7110F(PB15:4), manufactured by BASF SE), 5 parts by mass of a dispersant (Product name: BYK-9151, manufactured by BYK Japan KK), and 80 parts by mass of cyclic trimethylpropane formal acrylate (manufactured by Osaka Organic Chemical Industry Ltd.) were dispersed at a dispersing temperature of 35° C. and a rotation speed of 5,000 rpm for 20 minutes using a homogenizer. Next, this was placed in a 1 L sand mill filled with zirconia beads (diameter: 0.3 mm) at a filling rate of 90 volume % and dispersed at a dispersing temperature of 30° C. and a rotation rate of 10 m/second for one hour to prepare a Pigment dispersion B2.

<Preparation of Pigment Dispersion C2>

15 parts by mass of a black pigment (Product name: MOGUL-E, manufactured by Orion Engineered Carbons Co, Ltd), 5 parts by mass of a dispersant (Product name: BYK -167, manufactured by BYK Japan KK), and 80 parts by mass of phenoxyethyl acrylate (manufactured by Osaka Organic Chemical Industry Ltd.) were placed in a 300 mL ball mill filled with zirconia beads (diameter: 2 mm) at a filling rate of 43 volume %, and dispersed at a dispersing temperature of 25° C. and a rotation rate of 70 rpm for 180 hours to prepare a Pigment dispersion C2.

<Preparation of Pigment Dispersion D2>

15 parts by mass of a yellow pigment (Product name: LIONOL YELLOW TT-1703, PY17, manufactured by Toyo Ink Co., Ltd.), 2 parts by mass of a polymerizable group-containing reactive dispersant (Product name: SOLSPERSE X300, manufactured by The Lubrizol Corporation), and 83 parts by mass of tetrahydrofurfuryl acrylate (manufactured by Kyoeisha Chemical Co., Ltd.) were placed in a 300 mL ball mill filled with zirconia beads (diameter: 2 mm) at a filling rate of 45 volume %, and dispersed at a dispersing temperature of 25° C. and a rotation rate of 70 rpm for 200 hours to prepare a Pigment dispersion D2.

<Preparation of Pigment Dispersion E2>

15 parts by mass of a yellow pigment (Product name: 4GC, Y155, manufactured by Clariant Co., Ltd, 10 parts by mass of a dispersant (Product name: BYK-9152, manufactured by BYK Japan KK), and 75 parts by mass of stearyl acrylate (manufactured by Osaka Organic Chemical Industry Ltd.) were placed in a 300 mL ball mill filled with zirconia beads (diameter: 2 mm) at a filling rate of 45 volume %, and dispersed at a dispersing temperature of 25° C. and a rotation rate of 70 rpm for 200 hours to prepare a. Pigment dispersion E2.

<Preparation of Pigment Dispersion F2>

A Pigment dispersion F2 was prepared in the same manner as the preparation of the Pigment dispersion A with the exception that the dispersant and the polymerizable monomer used in the preparation of the Pigment dispersion A were respectively changed to another dispersant (Product name: BYK-9152, manufactured by BYK Japan KK) and acryloylmorpholine (manufactured by Kohjin Film & Chemicals Co., Ltd.).

The composition of each of the prepared pigment dispersions A2 to F2 is shown in Table 2.

TABLE 2

|  |  |  | Dispersant monomer | | | | | | |
|  |  | SP value | Saturation concentration of water (%) | A2 | B2 | C2 | D2 | E2 | F2 |
| --- | --- | --- | --- | --- | --- | --- | --- | --- | --- |
| Pigment | Magenta: RGT (PR122) |  |  | 15 |  |  |  |  | 15 |
|  | Cyan: D7110F (PB15:4) |  |  |  | 15 |  |  |  |  |
|  | Black: MOGUL-E (CB) |  |  |  |  | 15 |  |  |  |
|  | Yellow: (PY17) |  |  |  |  |  | 15 |  |  |
|  | Yellow: (PY115) |  |  |  |  |  |  | 15 |  |
| Dispersant | X300 (hydrophobic dispersant) |  | 1.2 | 10 |  |  | 2 |  |  |
|  | BYK-9151 (hydrophilic dispersant) |  | 10 or more |  | 5 |  |  |  |  |
|  | BYK-9152 (hydrophilic dispersant) |  | 10 or more |  |  |  |  | 10 | 10 |
|  | BYK-167 (hydrophobic dispersant) |  | 2.8 |  |  | 5 |  |  |  |
| Polymerizable compound | Cyclic trimethylolpropane formal acrylate | 9.5 | 1.7 |  | 80 |  |  |  |  |
|  | Acryloylmorpholine | 11.2 | 10 or more |  |  |  |  |  | 75 |
|  | Stearyl acrylate | 8.7 | 0.6 |  |  |  |  | 75 |  |
|  | Tetrahydrofurfuryl acrylate | 9.4 | 1.5 |  |  |  | 83 |  |  |
|  | Benzyl acrylate | 10.1 | 0.9 | 75 |  |  |  |  |  |
|  | Phenoxyethyl acrylate | 10.1 | 1.1 |  |  | 80 |  |  |  |
| Total (% by mass) |  |  |  | 100 | 100 | 100 | 100 | 100 | 100 |

Example 1

20.0 parts by mass of the white pigment dispersion A, 30.0 parts by mass of isoamyl acrylate (manufactured by Osaka Organic Chemical Industry Ltd., SP: 9.0 (cal/cm$^3$)$^{0.5}$, saturation concentration of water: 0.7% by mass), 37.0 parts by mass of cyclohexyl acrylate (manufactured by Osaka Organic Chemical Industry Ltd., SP: 9.6 (cal/cm$^3$)$^{0.5}$, saturation concentration of water: 0.8% by mass), 1.0 part by mass of trimethylolpropane triacrylate (manufactured by Osaka Organic Chemical Industry Ltd., SP: 10.4 (cal/cm$^3$)$^{0.5}$, saturation concentration of water: 1.8% by mass), 5.0 parts by mass of bis(2,4,6-trimethylbenzoyl)-phenylphosphine oxide (Product name: IRGACURE819, manufactured by BASF SE), 3.0 parts by mass of 2,4,6-trimethylbenzoyl-diphenyl-phosphine oxide (Product name: LUCIRIN TPO, manufactured by BASF SE), 3.5 parts by mass of 2,4-diethylthioxanthone (Product name: Speedcure DETX, Manufactured by Lambson Limited), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Example 1 was obtained.

Example 2

20.0 parts by mass of the black pigment dispersion B, 49.0 parts by mass of cyclohexyl acrylate (manufactured by Osaka Organic Chemical Industry Ltd., SP: 9.6 (cal/cm$^3$)$^{0.5}$, saturation concentration of water: 0.8% by mass), 19.0 parts by mass of 1,6-hexanediol diacrylate (manufactured by Osaka Organic Chemical Industry Ltd., SP: 10.0 (cal/cm$^3$)$^{0.5}$, saturation concentration of water: 1.2% by mass), 5.0 parts by mass of bis (2,4,6-trimethylbenzoyl)-phenylphosphine oxide (Product name: IRGACURE819, manufactured by BASF SE), 3.0 parts by mass of 2,4,6-trimethylbenzoyl-diphenyl-phosphine oxide (Product name: LUCIRIN TPO, manufactured by BASF SE), 3.5 parts by mass of 2,4-diethylthioxanthone (Product name: Speedcure DETX, Manufactured by Lambson Limited), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Example 2 was obtained.

Example 3

20.0 parts by mass of the yellow pigment dispersion C, 30.0 parts by mass of stearyl acrylate (manufactured by Osaka Organic Chemical Industry Ltd., SP: 8.7 (cal/cm$^3$)$^{0.5}$, saturation concentration of water: 0.6% by mass), 27.0 parts by mass of lauryl acrylate (manufactured by Osaka Organic Chemical Industry Ltd., SP: 8.9 (cal/cm$^3$)$^{0.5}$, saturation concentration of water: 0.7% by mass), 1.0 part by mass of pentaerythritol triacrylate (manufactured by Osaka Organic Chemical Industry Ltd., SP: 10.5 (cal/cm$^3$)$^{0.5}$, saturation concentration of water: 1.5% by mass), 10.0 parts by mass of urethane acrylic oligomer (Product name: CN966, manufactured by The Nippon Synthetic Chemical Industry Co., Ltd.), 5.0 parts by mass of bis (2,4,6-trimethylbenzoyl)-phenylphosphine oxide (Product name: IRGACURE819, manufactured by BASF SE), 3.0 parts by mass of 2,4,6-trimethylbenzoyl-diphenyl-phosphine oxide (Product name: LUCIRIN PO, manufactured by BASF SE), 3.5 parts by mass of 2,4-diethylthioxanthone (Product name: Speedcure ETX, Manufactured by Lambson Limited), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Example 3 was obtained.

Example 4

20.0 parts by mass of the cyan pigment dispersion D, 63.0 parts by mass of cyclic trimethylolpropane formal acrylate (manufactured by Osaka Organic Chemical Industry Ltd., SP: 9.5 $(cal/cm^3)^{0.5}$, saturation concentration of water: 1.7% by mass), 5.0 parts by mass of 1,9-nonanediol diacrylate (manufactured by Osaka Organic Chemical Industry Ltd., SP: 9.8 $(cal/cm^3)^{0.5}$, the saturation concentration of water: 1.1% by mass), 5.0 parts by mass of urethane acrylic oligomer (Product name: UV-3200B, manufactured by The Nippon Synthetic Chemical Industry Co., Ltd.), 6.5 parts by mass of 2-benzyl-2-dimethylamino1-(4-morpholinophenyl)-butanone-1 (Product name: IRGACURE369, manufactured by BASF SE), 0.2 part by mass of p-methoxyphenol (manufactured by Nippon Kayaku Co., Ltd.), and 0.3 part by mass of an acrylic-functional-group-containing modified polydimethylsiloxane (Product name: BYK-3576, manufactured by BYK Japan KK) were mixed and a curable composition of Example 4 was obtained.

Example 5

20.0 parts by mass of the magenta pigment dispersion E, 30.0 parts by mass of cyclic trimethylolpropane formal acrylate (manufactured by Osaka Organic Chemical Industry Ltd., SP: 9.5 $(cal/cm^3)^{0.5}$, saturation concentration of water: 1.7% by mass), 30.0 parts by mass of benzyl acrylate (manufactured by Osaka Organic Chemical Industry Ltd., SP: 10.1 $(cal/cm^3)^{0.5}$, the saturation concentration of water: 0.9% by mass), 10.0 parts by mass of diethylene glycol diacrylate (manufactured by Osaka Organic Chemical Industry Ltd., SP: 9.8 $(cal/cm^3)^{0.5}$, saturation concentration of water: 1.9% by mass), 6.0 parts by mass of urethane acrylic oligomer (Product name: UV-3200B, manufactured by The Nippon Synthetic Chemical Industry Co., Ltd.), 3.5 parts by mass of 2-(dimethylamino)-2-[(4-methyl-phenyl)-methyl]-1-[4-(4-morpholinyl)phenyl]—1-butanone (Product name: IRGACURE379, manufactured by BASF SE), 0.2 parts by mass of p-methoxyphenol (manufactured by Nippon Kayaku Co., Ltd.), and 0.3 part by mass of polyether-modified polydimethylsiloxane (Product name: BYK3510, manufactured by BYK Japan KK) were mixed and a curable composition of Example 5 was obtained.

Example 6

20.0 parts by mass of the magenta pigment dispersion E, 65.0 parts by mass of benzyl acrylate (manufactured by Osaka Organic Chemical Industry Ltd., SP: 10.1 $(cal/cm^3)^{0.5}$, saturation concentration of water: 0.9% by mass), 3.0 parts by mass of 1,9-nonanediol diacrylate (manufactured by Osaka Organic Chemical Industry Ltd., SP: 9.8 $(cal/cm^3)^{0.5}$, saturation concentration of water: 1.1% by mass), 7.0 parts by mass of urethane acrylic oligomer (Product name: UV-3200B, manufactured by The Nippon Synthetic Chemical Industry Co., Ltd.), 4.5 parts by mass of 2-(dimethylamino)-2-[(4-methyl-phenyl)-methyl]-1-[4-(4-morpholinyl)phenyl]—1-butanone (Product name: IRGACURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Example 6 was obtained.

Example 7

10 parts by mass of the Pigment dispersion A2, 75 parts by mass of benzyl acrylate (manufactured by Osaka Organic Chemical Industry Ltd.), 3 parts by mass of 1,9-nonanediol diacrylate (manufactured by Osaka Organic Chemical Industry Ltd.), 7 parts by mass of urethane acrylic oligomer (Product name: UV-3200B, manufactured by The Nippon Synthetic Chemical Industry Co., Ltd.), 4.8 parts by mass of 2-(dimethylamino)-2-[(4-methyl-phenyl)-methyl]-1-[4-(4-morpholinyl)phenyl]-1-butanone (Product name: IRGACURE379, manufactured by BASF SE), and 0.2 part by mass of p-methoxyphenol (manufactured by Nippon Kayaku Co., Ltd.) were mixed and a curable composition of Example 7 was obtained.

Example 8

20 parts by mass of the Pigment dispersion B2, 63 parts by mass of cyclic trimethylolpropane formal acrylate (manufactured by Osaka Organic Chemical Industry Ltd.), 5 parts by mass of 1,9-nonanediol diacrylate (manufactured by Osaka Organic Chemical Industry Ltd.), 5 parts by mass of urethane acrylic oligomer (Product name: UV-3200B, manufactured by The Nippon Synthetic Chemical Industry Co., Ltd.), 6.8 parts by mass of 2-benzyl-2-dimethylamino1-(4-morpholinophenyl)-butanone-1 (Product name: IRGACURE369, manufactured by BASF SE), and 0.2 part by mass of p-methoxyphenol (manufactured by Nippon Kayaku Co., Ltd.) were mixed and a curable composition of Example 8 was obtained.

Example 9

20 parts by mass of the Pigment dispersion A2, 30 parts by mass of benzyl acrylate (manufactured by Osaka Organic Chemical Industry Ltd.), 30 parts by mass of cyclic trimethylolpropane formal acrylate (manufactured by Osaka Organic Chemical Industry Ltd.), 10 parts by mass of diethylene glycidyl acrylate (manufactured by Osaka Organic Chemical Industry Ltd.), 6 parts by mass of urethane acrylic oligomer (Product name: UV-3200B, manufactured by The Nippon Synthetic Chemical Industry Co., Ltd.), 3.8 parts by mass of 2-(dimethylamino)-2-[(4-methyl-phenyl)-methyl]-1-[4-(4-morpholinyl)phenyl]-1-butanone (Product name: IRGACURE379, manufactured by BASF SE), and 0.2 part by mass of p-methoxyphenol (manufactured by Nippon Kayaku Co., Ltd.) were mixed and a curable composition of Example 9 was obtained.

Example 10

20 parts by mass of the Pigment dispersion C2, 49 parts by mass of cyclohexyl acrylate (manufactured by Osaka Organic Chemical Industry Ltd.), 19 parts by mass of 1,6-hexanediol diacrylate (manufactured by Osaka Organic Chemical Industry Ltd.), 5 parts by mass of bis (2,4,6-trimethylbenzoyl)-phenylphosphine oxide (Product name: IRGACURE819, manufactured by BASF SE), 3 parts by mass of 2,4,6-trimethylbenzoyl-diphenyl-phosphine oxide (Product name: LUCIRIN TPO, manufactured by BASF SE), 3.8 parts by mass of 2,4-diethylthioxanthone (Product name: Speedcure DETX, Manufactured by Lambson Limited), and 0.2 part by mass of p-methoxyphenol (manufactured by Nippon Kayaku Co., Ltd.) were mixed and a curable composition of Example 10 was obtained.

Example 11

30 parts by mass of the Pigment dispersion D2, 30 parts by mass of isoamyl acrylate (manufactured by Osaka Organic Chemical Industry Ltd.), 27 parts by mass of cyclohexyl acrylate (manufactured by Osaka Organic Chemical Industry Ltd.), 1 part by mass of trimethylolpropane triacrylate (manufactured by Osaka Organic Chemical Industry Ltd.), 5 parts by mass of bis (2,4,6-trimethylbenzoyl)-phenylphosphine oxide (Product name: IRGACURE819, manufactured by BASF SE), 3 parts by mass of 2,4,6-trimethylbenzoyl-diphenyl-phosphine oxide (Product name: LUCIRIN TPO, manufactured by BASF SE), 3.8 parts by mass of 2,4-diethylthioxanthone (Product name: Speedcure DETX, Manufactured by Lambson Limited), and 0.2 part by mass of p-methoxyphenol (manufactured by Nippon Kayaku Co., Ltd.) were mixed and a curable composition of Example 11 was obtained.

Example 12

20 parts by mass of the Pigment dispersion E2, 30 parts by mass of stearyl acrylate (manufactured by Osaka Organic Chemical Industry Ltd.), 27 parts by mass of lauryl acrylate (manufactured by Osaka Organic Chemical Industry Ltd.), 1 part by mass of pentaerythritol triacrylate (manufactured by Osaka Organic Chemical Industry Ltd.), 10 parts by mass of urethane acrylic oligomer (Product name: CN966, manufactured by The Nippon Synthetic Chemical Industry Co., Ltd.), 5 parts by mass of bis (2,4,6-trimethylbenzoyl)-phenylphosphine oxide (Product name: IRGACURE819, manufactured by BASF SE), 3 parts by mass of 2,4,6-trimethylbenzoyl-diphenyl-phosphine oxide (Product name: LUCIRIN TPO, manufactured by BASF SE), 3.8 parts by mass of 2,4-diethylthioxanthone (Product name: Speedcure DETX, Manufactured by Lambson Limited), and 0.2 part by mass of p-methoxyphenol (manufactured by Nippon Kayaku Co., Ltd.) were mixed and a curable composition of Example 12 was obtained.

Example 13

20 parts by mass of the Pigment dispersion A2, 30 parts by mass of benzyl acrylate (manufactured by Osaka Organic Chemical Industry Ltd.), 30 parts by mass of N-vinyl caprolactam (manufactured by Osaka Organic Chemical Industry Ltd.), 8 parts by mass of 1,9-nonanediol diacrylate (manufactured by Osaka Organic Chemical Industry Ltd.), 5 parts by mass of urethane acrylic oligomer (Product name: UV-3200B, manufactured by The Nippon Synthetic Chemical Industry Co., Ltd.), 6.8 parts by mass of 2-(dimethylamino)-2-[(4-methyl-phenyl)-methyl]-1-[4-(4-morpholinyl) phenyl]-1-butanone (Product name: IRGACURE379, manufactured by BASF SE), and 0.2 part by mass of p-methoxyphenol (manufactured by Nippon Kayaku Co., Ltd.) were mixed and a curable composition of Example 13 was obtained.

Comparative Example 1

20.0 parts by mass of the black pigment dispersion B, 38.0 parts by mass of stearyl acrylate (manufactured by Osaka Organic Chemical Industry Ltd., SP: 8.7 $(cal/cm^3)^{0.5}$, saturation concentration of water: 0.6% by mass), 30.0 parts by mass of phenoxyethyl acrylate (manufactured by Osaka Organic Chemical Industry Ltd., SP: 10.1 $(cal/cm^3)^{0.5}$, saturation concentration of water: 1.1% by mass), 5.0 parts by mass of bis (2,4,6-trimethylbenzoyl)-phenylphosphine oxide (Product name: IRGACURE819, manufactured by BASF SE), 3.0 parts by mass of 2,4,6-trimethylbenzoyl-diphenyl-phosphine oxide (Product name: LUCIRIN TPO, manufactured by BASF SE), 3.5 parts by mass of 2,4-diethylthioxanthone (Product name: Speedcure DETX, Manufactured by Lambson Limited), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 1 was obtained.

Comparative Example 2

20.0 parts by mass of the black pigment dispersion B, 20.0 parts by mass of stearyl acrylate (manufactured by Osaka Organic Chemical Industry Ltd., SP: 8.7 $(cal/cm^3)^{0.5}$, saturation concentration of water: 0.6% by mass), 40.0 parts by mass of phenoxyethyl acrylate (manufactured by Osaka Organic Chemical Industry Ltd., SP: 10.1 $(cal/cm^3)^{0.5}$, the saturation concentration of water: 1.1% by mass), 10.0 parts by mass of diethylene glycol diacrylate (manufactured by Osaka Organic Chemical Industry Ltd., SP: 9.8 $(cal/cm^3)^{0.5}$, saturation concentration of water: 1.9% by mass), 6.0 parts by mass of urethane acrylic oligomer (Product name: UV-3200B, manufactured by The Nippon Synthetic Chemical Industry Co., Ltd.), 3.5 parts by mass of 2-(dimethylamino)-2-[(4-methyl-phenyl)-methyl]-1-[4-(4-morpholinyl) phenyl]-1-butanone (Product name: IRGACURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 2 was obtained.

Comparative Example 3

20.0 parts by mass of the magenta pigment dispersion E, 5.0 parts by mass of trifluoroethyl acrylate (manufactured by Osaka Organic Chemical Industry Ltd., SP: 6.8 $(cal/cm^3)^{0.5}$, saturation concentration of water: 0.5% by mass), 30.0 parts by mass of cyclic trimethylolpropane formal acrylate (manufactured by Osaka Organic Chemical Industry Ltd., SP: 9.5 $(cal/cm^3)^{0.5}$, saturation concentration of water: 1.7% by mass), 30.0 parts by mass of benzyl acrylate (manufactured by Osaka Organic Chemical Industry Ltd., SP: 10.1 $(cal/cm^3)^{0.5}$, saturation concentration of water: 0.9% by mass), 5.0 parts by mass of diethylene glycol diacrylate (manufactured by Osaka Organic Chemical Industry Ltd., SP: 9.8 $(cal/cm^3)^{0.5}$, saturation concentration of water: 1.9% by mass), 6.0 parts by mass of urethane acrylic oligomer (Product name: UV-3200B, manufactured by The Nippon Synthetic Chemical Industry Co., Ltd.), 3.5 parts by mass of 2-(dimethylamino)-2-[(4-methyl-phenyl)-methyl]-1-[4-(4-morpholinyl) phenyl]-1-butanone (Product name: IRGACURE379, manufactured by BASF SE), 0.2 parts by mass of p-methoxyphenol (manufactured by Nippon Kayaku Co., Ltd.), and 0.3 part by mass of polyether-modified polydimethylsiloxane (Product name: BYK3510, manufactured by BYK Japan KK) were mixed and a curable composition of Comparative example 3 was obtained.

Comparative Example 4

20.0 parts by mass of the magenta pigment dispersion F, 25.0 parts by mass of acryloylmorpholine (manufactured by KJ Chemical Corporation, SP: 11.2 $(cal/cm^3)^{0.5}$, saturation concentration of water: 10% by mass or more), 38.0 parts by mass of 4-hydroxybutyl acrylate (manufactured by Osaka Organic Chemical Industry Ltd., SP: 11.8 $(cal/cm^3)^{0.5}$, saturation concentration of water: 10% by mass or more), 5.0 parts by mass of 1,9-nonanediol diacrylate (manufactured by Osaka Organic Chemical Industry Ltd., SP: 9.8 (cal/cm$^3$)$^{0.5}$, saturation concentration of water: 1.1% by mass), 5.0 parts by mass of urethane acrylic oligomer (Product name: UV-3200B, manufactured by The Nippon Synthetic Chemical Industry Co., Ltd.), 6.5 parts by mass of 2-benzyl-2-dimethylamino1-(4-morpholinophenyl)-butanone-1 (Product name: IRGACURE369, manufactured by BASF SE), 0.2 part by mass of p-methoxyphenol (manufactured by Nippon Kayaku Co., Ltd.), and 0.3 part by mass of an acrylic-functional-group-containing modified polydimethylsiloxane (Product name: BYK-3576, manufactured by BYK Japan KK) were mixed and a curable composition of Comparative example 4 was obtained.

Comparative Example 5

20.0 parts by mass of the magenta pigment dispersion E, 57.0 parts by mass of isobornyl acrylate (manufactured by Osaka Organic Chemical Industry Ltd., SP: 8.7 (cal/cm$^3$)$^{0.5}$, saturation concentration of water: 0.8% by mass), 8.0 parts by mass of benzyl acrylate (manufactured by Osaka Organic Chemical Industry Ltd., SP: 10.1 (cal/cm$^3$)$^{0.5}$, saturation concentration of water: 0.9% by mass), 3.0 parts by mass of 1,9-nonanediol diacrylate (manufactured by Osaka Organic Chemical Industry Ltd., SP: 9.8 (cal/cm$^3$)$^{0.5}$, the saturation concentration of water: 1.1% by mass), 7.0 parts by mass of urethane acrylic oligomer (Product name: UV-3200B, manufactured by The Nippon Synthetic Chemical Industry Co., Ltd.), 4.5 parts by mass of 2-(dimethylamino)-2-[(4-methyl-phenyl)-methyl]-1-[4-(4-morpholinyl)phenyl]-1-butanone (Product name: IRGACURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK -3510, manufactured by BYK Japan KK) were mixed and a curable composition of Comparative example 5 was obtained.

Comparative Example 6

20 parts by mass of the Pigment dispersion A2, 8 parts by mass of benzyl acrylate (manufactured by Osaka Organic Chemical Industry Ltd.), 57 parts by mass of isobornyl acrylate (manufactured by Osaka Organic Chemical Industry Ltd.), 3 parts by mass of 1,9-nonanediol diacrylate (manufactured by Osaka Organic Chemical Industry Ltd.), 7 parts by mass of urethane acrylic oligomer (Product name: UV-3200B, manufactured by The Nippon Synthetic Chemical Industry Co., Ltd.), 4.5 parts by mass of 2-(dimethylamino)-2-[(4-methyl-phenyl)-methyl]-1-[4-(4-morpholinyl)phenyl]-1-butanone (Product name: IRGACURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 6 was obtained.

Comparative Example 7

20 parts by mass of the Pigment dispersion F2, 38 parts by mass of 4-hydroxybutyl acrylate (manufactured by Osaka Organic Chemical Industry Ltd.), 25 parts by mass of acryloylmorpholine (manufactured by KJ Chemicals Corporation), 5 parts by mass of 1,9-nonanediol diacrylate (manufactured by Osaka Organic Chemical Industry Ltd.), 5 parts by mass of urethane acrylic oligomer (Product name: UV-3200B, manufactured by The Nippon Synthetic Chemical Industry Co., Ltd.), 6.5 parts by mass of 2-benzyl-2-dimethylamino-1-(4-morpholinophenyl)-butanone-1 (Product name: IRGACURE369, manufactured by BASF SE), 0.2 part by mass of p-methoxyphenol (manufactured by Nippon Kayaku Co., Ltd.), and 0.3 part by mass of an acrylic-functional-group-containing modified polydimethylsiloxane (Product name: BYK-3576, manufactured by BYK Japan KK) were mixed and a curable composition of Comparative example 7 was obtained.

Comparative Example 8

20 parts by mass of the Pigment dispersion C2, 20 parts by mass of stearyl acrylate (manufactured by Osaka Organic Chemical Industry Ltd.), 40 parts by mass of phenoxyethyl acrylate (manufactured by Osaka Organic Chemical Industry Ltd.), 10 parts by mass of diethylene glycidyl acrylate (manufactured by Osaka Organic Chemical Industry Ltd.), 6 parts by mass of urethane acrylic oligomer (Product name: UV-3200B, manufactured by The Nippon Synthetic Chemical Industry Co., Ltd.), 3.5 parts by mass of 2-(dimethylamino)-2-[(4-methyl-phenyl)-methyl]-1-[4-(4-morpholinyl)phenyl]-1-butanone (Product name: IRGACURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 8 was obtained.

Comparative Example 9

20 parts by mass of the Pigment dispersion C2, 38 parts by mass of stearyl acrylate (manufactured by Osaka Organic Chemical Industry Ltd.), 35 parts by mass of phenoxyethyl acrylate (manufactured by Osaka Organic Chemical Industry Ltd.), 5 parts by mass of bis (2,4,6-trimethylbenzoyl)-phenylphosphine oxide (Product name: IRGACURE819, manufactured by BASF SE), 3 parts by mass of 2,4,6-trimethylbenzoyl-diphenyl-phosphine oxide (Product name: LUCIRIN TPO, manufactured by BASF SE), 3.5 parts by mass of 2,4-diethylthioxanthone (Product name: Speedcure DETX, Manufactured by Lambson Limited), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 9 was obtained.

Comparative Example 10

20 parts by mass of the Pigment dispersion A2, 30 parts by mass of benzyl acrylate (manufactured by Osaka Organic Chemical Industry Ltd.), 30 parts by mass of cyclic trimethylolpropane formal acrylate (manufactured by Osaka Organic Chemical Industry Ltd.), 5 parts by mass of trifluoroethyl acrylate (manufactured by Osaka Organic Chemical Industry Ltd.), 5 parts by mass of diethylene glycol diacrylate (manufactured by Osaka Organic Chemical Industry Ltd.), 6 parts by mass of urethane acrylic oligomer (Product name: UV-3200B, manufactured by The Nippon Synthetic Chemical Industry Co., Ltd.), 3.5 parts by mass of 2-(dimethylamino)-2-[(4-methyl-phenyl)-methyl]-1-[4-(4-morpholinyl)phenyl]-1-butanone (Product name: IRGA- CURE379, manufactured by BASF SE), 0.2 part by mass of p-methoxyphenol (manufactured by Nippon Kayaku Co., Ltd.), and 0.3 part by mass of polyether-modified polydimethylsiloxane (Product name: BYK-3510, manufactured by BYK Japan KK) were mixed and a curable composition of Comparative example 10 was obtained.

(Preparation of Cured Product)

Each of the obtained curable compositions of Examples 1 to 13 and Comparative examples 1 to 10 were used to obtain a 10 cm×10 cm solid image on a substrate (Product name: COSMOSHINE A4300 PET film, manufactured by Toyobo Co., Ltd, average thickness: 100 μm, color: transparent, below, referred to as the "PET film") using a test printer which was a modified printer (Device name: SG7100, manufactured by Ricoh Co., Ltd.). The obtained solid image was subjected to a curing process using an UV-LED device (Device name: a single-path water-cooling UV-LED module, manufactured by Ushio Inc.) for an inkjet printer, and a cured product having a 10 cm×10 cm solid image in which the average thickness of the cured film was 10 μm (in the evaluation of the water discoloration resistance, the average thickness of the cured film was 20 μm) was obtained on the substrate.

Note that, the average thickness of the cured film was obtained by measuring the thickness of the cured film at 10 points using an electronic micrometer (manufactured by Anritsu Corporation), and calculating an average value of the thicknesses of the 10 measured points.

Further, the test printer used the conveying and driving parts of Device name: SG7100 (manufactured by Ricoh Co., Ltd.), and the head part was changed to a MH2620 head (manufactured by Ricoh Co., Ltd.) which can perform heat discharge and corresponds to a high viscosity ink.

[Tg of the Cured Film]

The obtained cured products were placed in a differential scanning calorimeter (Device name: DSC7000X, manufactured by Hitachi High-Tech Science Corporation) and the Tg of the cured films were calculated.

Note that, the measurement was performed in a temperature range from room temperature (25° C.) to 120° C., at a heating rate of 5° C./minute, and with a sample amount of 10 mg, in a nitrogen atmosphere. Further, the peak temperature was deemed to be the Tg (glass transition point).

The "laminate adhesion", the "label substrate adhesion", the "water resistant adhesion", the "water discoloration resistance", and the "water absorption rate of the cured film" were evaluated as follows for the obtained curable compositions of Examples 1 to 13 and Comparative examples 1 to 10. The results are shown in the following Tables 3, 6, 7 and 10. Further, the "void area ratio of the cured film" was evaluated as follows for the obtained curable compositions of Examples 1 to 13 and Comparative examples 1 to 10. The results are shown in Tables 6 and 10.

<Protective Layer (Laminate) Adhesion>

A hard PVC (polyvinyl chloride) film (Product name: Shiroku 1/4 1000, manufactured by Japan Office Laminator Co., Ltd, thickness: 100 μm) with paste as a protective layer was placed on the 10 cm×10 cm cured product obtained on the substrate (PET film) so as to sandwich the cured product, and was laminated at 100° C. Next, the cured product was cut with a cutter knife from above the hard PVC film into a grid pattern at 1 mm intervals in accordance with JIS K5600, and a film adhesive cellophane tape (Product name: SCOTCH Mending Tape, manufactured by 3M Japan Limited, width: 18 mm) was adhered to the hard PVC film. Next, the film adhesive cellophane tape was peeled off, and the peeled surface of the hard PVC film was observed using a loupe (Product name: PEAK No. 1961 (×10), manufactured by Tohkai Sangyo Co., Ltd.). In accordance with the JIS K5600 cross cut test, the adhesion between the cured film and the hard PVC film (protective layer and laminate) corresponds to the evaluation rank from Class 0 to Class 5 in the JIS K5600 cross-cut evaluation ranking, and the "protective layer (laminate) adhesion" was evaluated based on the following evaluation criteria. Note that, an evaluation of "B" or higher in the evaluation criteria is considered to be the executable level for the protective layer (laminate) adhesion.

—Evaluation Criteria—

A: Class 0 in the JIS K5600 cross-cut evaluation ranking

B: Class 1 in the JIS K5600 cross-cut evaluation ranking

C: From Class 2 to Class 3 in the JIS K5600 cross-cut evaluation ranking

D: Class 4 or lower in the JIS K5600 cross-cut evaluation ranking

<Label Substrate Adhesion>

A paper (Product name: OK TOP COAT, manufactured by Oji Paper Co., Ltd., thickness: 101 μm) was adhered as the label substrate to the 10 cm×10 cm cured product obtained on the substrate (PET film) so as to sandwich the cured product. Next, the cured product was cut with a cutter knife from above the paper into a grid pattern at 1 mm intervals in accordance with JIS K5600, and a film adhesive cellophane tape (Product name: SCOTCH Mending Tape, manufactured by 3M Japan Limited, width: 18 mm) was adhered to the paper. Next, the film adhesive cellophane tape was peeled off, and the peeled surface of the paper was observed using a loupe (Product name: PEAK No. 1961 (×10), manufactured by Tohkai Sangyo Co., Ltd.). In accordance with the JIS K5600 cross cut test, the adhesion between the cured film and the paper (label substrate) corresponds to the evaluation rank from Class 0 to Class 5 in the JIS K5600 cross-cut evaluation ranking, as shown in FIG. 11, and the "label substrate (paper) adhesion" was evaluated based on the following evaluation criteria.

Further, the "label substrate (glass) adhesion", and the "label substrate (metal) adhesion" were evaluated in the same manner as the paper with the exception that the label substrate was respectively changed to glass (Product name: S9213, manufactured by Matsunami Glass Inc., Ltd., thickness: 2 mm) and an aluminum sheet (Product name: EA441WA-15, manufactured by Esco Co, Ltd., thickness: 2 mm). Note that, an evaluation of "B" or higher in the evaluation criteria for either label substrate is considered to be the executable level for the label substrate adhesion.

—Evaluation Criteria—

A: Class 0 in the JIS K5600 cross-cut evaluation ranking

B: Class 1 in the JIS K5600 cross-cut evaluation ranking

C: From Class 2 to Class 3 in the JIS K5600 cross-cut evaluation ranking

D: Class 4 or lower in the JIS K5600 cross-cut evaluation ranking

<Water Resistant Adhesion>

400 mL of pure water was placed in a 500 mL polypropylene beaker (Product name: Descup, manufactured by Teraoka Seiko Co., Ltd), covered with aluminum foil, and placed in a constant temperature bath at 40° C. When the temperature of the pure water reached 40° C., the obtained 10 cm×10 cm cured product having a thickness of 20 μm was immersed in water in the beaker, and stored for 24 hours in a constant temperature bath. Next, the cured product was taken out and cut with a cutter knife into a grid pattern at 1 mm intervals in accordance with JIS K5600, and the adhesive cellophane tape (Product name: SCOTCH Mending Tape, manufactured by 3M Japan Limited, width: 18 mm) was adhered to the cured product. Next, the film adhesive cellophane tape was peeled off, and the peeled surface was observed using a loupe (Product name: PEAK No. 1961 (×10), manufactured by Tohkai Sangyo Co., Ltd.). In accordance with the JIS K5600 cross cut test, the water resistant adhesion of the cured film corresponds to the evaluation rank from Class 0 to Class 5 in the JIS K5600 cross-cut evaluation ranking, and the "water resistant adhesion" was evaluated based on the following evaluation criteria. Note that, an evaluation of "B" or higher in the evaluation criteria is considered to be the executable level for the water resistant adhesion.

—Evaluation Criteria—

A: Class 0 in the JIS K5600 cross-cut evaluation ranking

B: Class 1 in the JIS K5600 cross-cut evaluation ranking

C: From Class 2 or Class 3 in the JIS K5600 cross-cut evaluation ranking

D: Class 3 or Class 4 in the JIS K5600 cross-cut evaluation ranking

<Water Discoloration Resistance>

A 10 cm×10 cm cured product having an average thickness of 20 Cpm was formed on the substrate (PET film) which is a transparent substrate. The curing was carried out under the above-described conditions for preparing the cured film. The cured product was placed on white paper (Product name: Type 6200 Paper, manufactured by Ricoh Co., Ltd.), and $L^*$, $a^*$, and $b^*$ were calculated using a reflective spectrodensitometer (Device name: X-Rite939, manufactured by X-Rite) prior to immersion in water.

Next, 400 mL of pure water was placed in a 500 mL polypropylene beaker (Product name: Descup, manufactured by Teraoka Seiko Co., Ltd), covered with aluminum foil, and placed in a 40° C. constant temperature bath. The obtained 10 cm×10 cm solid image of the cured product was immersed in water in the beaker, and stored for 24 hours in a constant temperature bath. Then, the cured product was taken out, and $L^*$, $a^*$, and $b^*$ after immersion in water were calculated by the same method as those prior to immersion in water.

Then, the color difference ΔE was calculated by the following Formula (I) to Formula (IV), and "the water discoloration resistance" was evaluated based on the following evaluation criteria. Note that, an evaluation of "B" or higher in the evaluation criteria is considered to be the executable level for the water resistant adhesion.

$$\Delta L^* = (L^* \text{prior to immersion in water}) - (L^* \text{after immersion in water}) \quad \text{Formula (I)}$$

$$\Delta a^* = (a^* \text{prior to immersion in water}) - (a^* \text{after immersion in water}) \quad \text{Formula (II)}$$

$$\Delta b^* = (b^* \text{prior to immersion in water}) - (b^* \text{after immersion in water}) \quad \text{Formula (III)}$$

$$\Delta E = [(\Delta L^*)^2 + (\Delta a^*)^2 + (\Delta b^*)^2]^{1/2} \quad \text{Formula (IV)}$$

—Evaluation Criteria—

A: The color difference ΔE was in excess of 2.0 or less

B: The color difference ΔE was in excess of 2.0 to 5.0

C: The color difference ΔE was in excess of 5.0 to 10.0

D: The color difference ΔE was in excess of 10.0

<Water Absorption Rate of Cured Film>

400 mL of pure water was placed in a 500 mL polypropylene beaker (Product name: Descup, manufactured by Teraoka Seiko Co., Ltd), covered with aluminum foil, and placed in a constant temperature bath at 40° C. When the temperature of the pure water reached 40° C., the obtained 10 cm×10 cm solid image of the cured product was immersed in water in the beaker, and stored for 24 hours in a constant temperature bath. The "water absorption rate of the cured film" was obtained from the following Formula (1) in accordance with the water absorption test described in "5.4 (3) Method for calculating the water absorption rate" of the specification of JIS A5208. Note that, 8% by mass or less is considered to be the executable level for the water absorption rate of the cured film.

$$\text{Water absorption rate of the cured film (\% by mass)} = \frac{\text{Mass of the cured film increased due to water absorption (g)}}{\text{Mass of the cured film prior to water absorption (g)}} \times 100 \quad \text{Formula (1)}$$

<Void Area Ratio>

Under the aforementioned water resistance test conditions, each cured film taken out was immersed in liquid nitrogen (−196° C.) for at least two minutes along with the substrates to be frozen, transferred to a cryo stage (−140° C.), processed by a focused ion beam to obtain a cross-section, and a scanning electron microscope (SEM) image of the cross-section was taken at a magnification of 10,000.

The obtained cross-sectional SEM image was subjected to binarization processing by image processing software (Image J), and the void area ratio was calculated from the following formula.

Void area ratio (%)=calculated total void area/photographic area (137.43 μm$^2$)

Figure 12A:
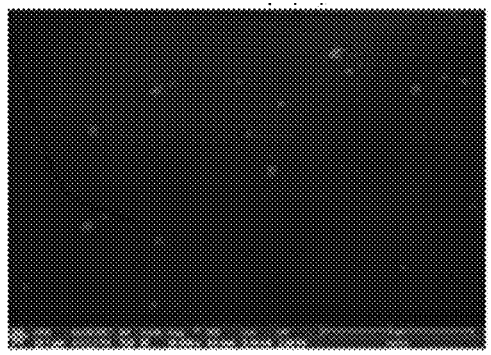
FIG. 12A is a cryo-SEM image of a cross-section of a cured film immediately after a water resistance test in Example 7.
Figure 12B:
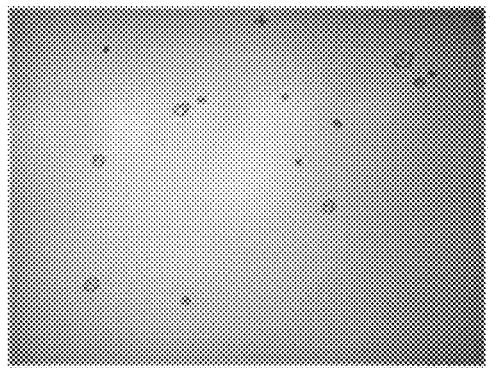
FIG. 12B is a binary image of the cross-section of the cured film immediately after the water resistance test in Example 7.

FIGS. 12A and 12B illustrate a cryo SEM image and a binary image of the cross-section of the cured film immediately after the water-resistivity test of Example 7. FIG. 12A is the cryo SEM image, and FIG. 12B is the binary image. The total void area was 1.35 μm$^2$ in the binary image of FIG. 12B, and the void area ratio obtained from the aforementioned formula was 1.0%.

Figure 12C:
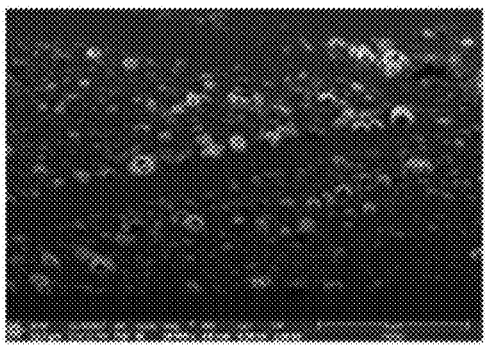
FIG. 12C is a cryo-SEM image of a cross-section of a cured film immediately after the water resistance test in Comparative example 9.
Figure 12D:
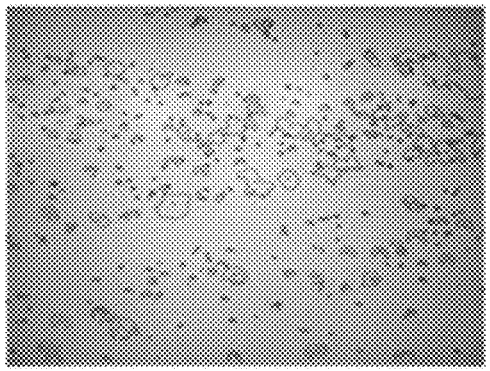
FIG. 12D is a binary image of the cross-section of the cured film immediately after the water resistance test in Comparative example 9.

FIGS. 12C and 12D) illustrate a cryo SEM image and a binary image of the cross-section of the cured film immediately after the water-resistivity test of Comparative example 9, FIG. 12C is the cryo SEM image, and FIG. 12D is the binary image. The total void area was 19.5 μm$^2$ in the binary image of FIG. 12D, and the void area ratio obtained from the aforementioned formula was 14.2%.

Figure 13:
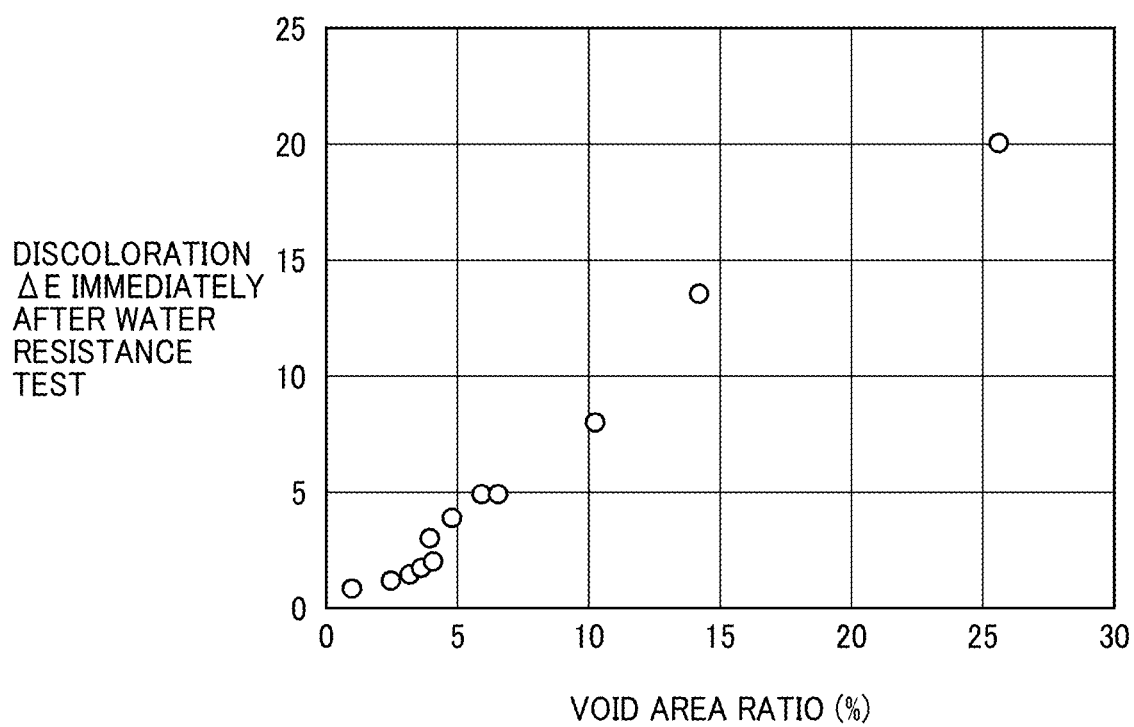
FIG. 13 is graph illustrating the relationship between the void area ratio and the water discoloration resistance of the cured film.

The relationship of the obtained void area ratio and the water discoloration resistance (ΔE) is shown in FIG. 13. From the results of FIG. 13, it can be verified that the smaller the void area ratio, the better the water discoloration resistance. Changing the optical properties of light entering into the coated film by the voids is considered to be one cause of discoloration by water, thus, it is understood that the discoloration by water can be prevented by the feature of making the void area ratio to 5% or less.

TABLE 3

| | | Example | | | | | |
|---|---|---|---|---|---|---|---|
| | | 1 | 2 | 3 | 4 | 5 | 6 |
| Pigment dispersion | White pigment dispersion A | 20.0 | — | — | — | — | — |
| | Black pigment dispersion B | — | 20.0 | — | — | — | — |
| | Yellow pigment dispersion C | — | — | 20.0 | — | — | — |
| | Cyan pigment dispersion D | — | — | — | 20.0 | — | — |
| | Magenta pigment dispersion E | — | — | — | — | 20.0 | 20.0 |
| | Magenta pigment dispersion F | — | — | — | — | — | — |
| Monofunctional monomer | Trifluoroethyl acrylate (SP value: 6.8, saturation concentration of water: 0.5% by mass) | — | — | — | — | — | — |
| | Stearyl acrylate (SP value: 8.7, saturation concentration of water: 0.6% by mass) | — | — | 30.0 | — | — | — |
| | Isobornyl acrylate (SP value: 8.7, saturation concentration of water: 0.8% by mass) | — | — | — | — | — | — |
| | Lauryl acrylate (SP value: 8.9, saturation concentration of water: 0.7% by mass) | — | — | 27.0 | — | — | — |
| | Isoamyl acrylate (SP value: 9.0, saturation concentration of water: 0.7% by mass) | 30.0 | — | — | — | — | — |
| | Cyclic trimethylolpropane formal acrylate (SP value: 9.5, saturation concentration of water: 1.7% by mass) | — | — | — | 63.0 | 30.0 | — |
| | Cyclohexyl acrylate (SP value: 9.6, saturation concentration of water: 0.8% by mass) | 37.0 | 49.0 | — | — | — | — |
| | Benzyl acrylate (SP value: 10.1, saturation concentration of water: 0.9% by mass) | — | — | — | — | 30.0 | 65.0 |
| | Phenoxyethyl acrylate (SP value: 10.1, saturation concentration of water: 1.1% by mass) | — | — | — | — | — | — |
| | Acryloylmorpholine (SP value: 11.1, saturation concentration of water: 10% by mass or more) | — | — | — | — | — | — |
| | 4-hydroxybutyl acrylate (SP value: 11.8, saturation concentration of water: 10% by mass or more) | — | — | — | — | — | — |
| Multifunctional monomer | 1,9-nonanediol diacrylate (SP value: 9.8, saturation concentration of water: 1.1% by mass) | — | — | — | 5.0 | — | 3.0 |
| | Diethylene glycol diacrylate (SP value: 9.8, saturation concentration of water: 1.5% by mass) | — | — | — | — | 10.0 | — |
| | 1,6-hexanediol diacrylate (SP value: 10.0, saturation concentration of water: 1.2% by mass) | — | 19.0 | — | — | — | — |
| | Trimethylolpropane triacrylate (SP value: 10.4, saturation concentration of water: 1.8% by mass) | 1.0 | — | — | — | — | — |
| | Pentaerythritol triacrylate (SP value: 10.5, saturation concentration of water: 1.5% by mass) | — | — | 1.0 | — | — | — |
| Polymerizable oligomer | Urethane acrylic oligomer (Product name: CN966) | — | — | 10.0 | — | — | — |
| | Urethane acrylic oligomer (Product name: UV-3200B) | — | — | — | 5.0 | 6.0 | 7.0 |
| Polymerization initiator | bis(2,4,6-trimethylbenzoyl)-phenylphosphine oxide | 5.0 | 5.0 | 5.0 | — | — | — |
| | 2,4,6-trimethylbenzoyl-diphenyl-phospine oxide | 3.0 | 3.0 | 3.0 | — | — | — |
| | 2,4-diethylthioxanthone | 3.5 | 3.5 | 3.5 | — | — | — |
| | 2-benzyl-2-dimethylamino1-(4-morpholinophenyl)-butanone-1 | — | — | — | 6.5 | — | — |
| | 2-(dimethylamino)-2-[(4-methyl-phenyl)-methyl]-1-[4-(4-morpholinyl)phenyl]-1-butanone | — | — | — | — | 3.5 | 4.5 |
| Polymerization inhibitor | p-methoxyphenol | 0.2 | 0.2 | 0.2 | 0.2 | 0.2 | 0.2 |
| Surfactant | Polyether-modified polydimethylsiloxane | 0.3 | 0.3 | 0.3 | — | 0.3 | 0.3 |
| | Acrylic-functional-group-containing modified polydimethylsiloxane | — | — | — | 0.3 | — | — |
| | Total (% by mass) | 100 | 100 | 100 | 100 | 100 | 100 |
| | Tg of the cured film (° C.) | 5.0 | 23.5 | 29.1 | 25.5 | 18.5 | 7.1 |
| Evaluation results | Protective layer (laminate) adhesion | A | A | B | A | A | A |
| | Label substrate (paper) adhesion | A | A | B | A | A | A |
| | Label substrate (glass) adhesion | B | A | B | A | A | A |
| | Label substrate (metal) adhesion | A | A | B | A | A | A |
| | Water resistant adhesion | A | A | B | A | A | A |
| | Water discoloration resistance | A | A | B | A | A | A |
| | Water absorption rate of the cured film (% by mass) | 4.2 | 3.3 | 5.5 | 2.5 | 2.8 | 0.9 |

TABLE 4

| | | | Monomer property | | Example | | | |
| --- | --- | --- | --- | --- | --- | --- | --- | --- |
| | | | SP Value | Water content (%) | 7 | 8 | 9 | 10 |
| Pigment dispertion | | Type | | | A2 | B2 | A2 | C2 |
| | | Content (% by mass) | | | 10 | 20 | 20 | 20 |
| Polymerizable compound | Monofunctional monomer | Benzyl acrylate | 10.1 | 0.9 | 75 | | 30 | |
| | | Cyclic trimethylolpropane formal acrylate | 9.5 | 1.7 | | 63 | 30 | |
| | | Cyclohexyl acrylate | 9.6 | 0.8 | | | | 49 |
| | | Isoamyl acrylate | 9 | 0.7 | | | | |
| | | Stearyl acrylate | 8.7 | 0.8 | | | | |
| | | Lauryl acrylate | 8.9 | 0.7 | | | | |
| | | 4-hydroxybutyl acrylate | 11.8 | 10 or more | | | | |
| | | Phenoxyethyl acrylate | 10.1 | 1 | | | | |
| | | Acryloylmorpholine | 11.2 | 10 or more | | | | |
| | | N-vinyl caprolactam | 10.8 | 2.1 | | | | |
| | | Isobornyl acrylate | 8.7 | 0.8 | | | | |
| | Multifunctional monomer | 1,9-nonanediol diacrylate | 9.8 | 1.1 | 3 | 5 | | |
| | | 1,6-hexanediol diacrylate | 10 | 1.2 | | | | 19 |
| | | Diethylene glycol diacrylate | 9.8 | 1.9 | | | 10 | |
| | | Trimethylolpropane triacrylate | 10.4 | 1.8 | | | | |
| | | Pentaerythritol triacrylate | 10.5 | 1.5 | | | | |
| | Polymerizable oligomer | Urethane acrylic oligomer | | | 7 | 5 | 6 | |
| Polymerization initiator | | 2-(dimethylamino)-2-[(4-methyl-phenyl)-methyl]-1-[4-(4-morpholinyl)phenyl]-1-butanone | | | 4.8 | | 3.8 | |
| | | bis(2,4,6-trimethylbenzoyl)-phenylphosphine oxide | | | | | | 5 |
| | | 2,4,6-trimethylbenzoyl-diphenyl-phosphine oxide | | | | | | 3 |
| | | 2,4-diethylthioxanthone | | | | | | 3.8 |
| | | 2-benzyl-2-dimethylamino1-(4-morpholinophenyl)-butanone-1 | | | | 6.8 | | |
| Polymerization inhibitor | | p-methoxyphenol | | | 0.2 | 0.2 | 0.2 | 0.2 |
| | | Total (% by mass) | | | 100 | 100 | 100 | 100 |

TABLE 5

| | | | Monomer property | | Example | | |
| --- | --- | --- | --- | --- | --- | --- | --- |
| | | | SP Value | Water content (%) | 11 | 12 | 13 |
| Pigment dispertion | | Type | | | D2 | E2 | A2 |
| | | Water content (5) | | | 30 | 20 | 20 |
| Polymerizable compound | Monofunctional monomer | Benzyl acrylate | 10.1 | 0.9 | | | 30 |
| | | Cyclic tritmethylolpropane formal acrylate | 9.5 | 1.7 | | | |
| | | Cyclohexyl acrylate | 9.6 | 0.8 | 27 | | |
| | | Isoamyl acrylate | 9 | 0.7 | 30 | | |
| | | Stearyl acrylate | 8.7 | 0.8 | | 30 | |
| | | Lauryl acrylate | 8.9 | 0.7 | | 27 | |
| | | 4-hydroxybutyl acrylate | 11.8 | 10 or more | | | |
| | | Phenoxyethyl acrylate | 10.1 | 1 | | | |
| | | Acryloylmorpholine | 11.2 | 10 or more | | | |
| | | N-vinyl caprolactam | 10.8 | 2.1 | | | 30 |
| | | Isobornyl acrylate | 8.7 | 0.8 | | | |
| | Muitifunctional monomer | 1,9-nonanediol diacrylate | 9.8 | 1.1 | | | 8 |
| | | 1,6-hexanediol diacrylate | 10 | 1.2 | | | |
| | | Diethylene glycol diacrylate | 9.8 | 1.9 | | | |
| | | Trimethylolpropane triacrylate | 10.4 | 1.8 | 1 | | |
| | | Trimethylolpropane triacrylate | 10.5 | 1.5 | | 1 | |
| | Polyrnerizable oligomer | Urethane acrylic oligomer | | | | 10 | 5 |

TABLE 5-continued

| | | Monomer property | | Example | | |
|---|---|---|---|---|---|---|
| | | SP Value | Water content (%) | 11 | 12 | 13 |
| Polymerization initiator | 2-(dimethylamino)-2-[(4-methyl-phenyl)-methyl]-1-[4-(4-morpholinyl)phenyl]-1-butanone | | | | | 6.8 |
| | bis(2,4,6-trimethylbenzoyl)-phenylphosphine oxide | | | 5 | 5 | |
| | 2,4,6-trimethylbenzoyl-diphenyl-phosohine oxide | | | 3 | 3 | |
| | 2,4-diethylthioxanthone | | | 3.8 | 3.8 | |
| | 2-benzyl-2-dimethylamino1-(4-morpholinophenyl)-butanone-1 | | | | | |
| Polymerization inhibitor | p-methoxyphenol | | | 0.2 | 0.2 | 0.2 |
| | Total (% by mass) | | | 100 | 100 | 100 |

TABLE 6

| | | Void area ratio of the cured film (%) | Tg of the cured film (°C.) | Water absorption rate of the cured film (%) | Water discoloration resistance | Water resistant adhesion | Laminate adhesion | Substrate adhesiom | | |
|---|---|---|---|---|---|---|---|---|---|---|
| | | | | | | | | TOPKOTE | Glass | Aluminum |
| Example | 7 | 1.0 | 7.0 | 0.8 | A | A | A | A | A | A |
| | 8 | 2.5 | 25.5 | 2.5 | A | A | A | A | A | A |
| | 9 | 3.2 | 18.5 | 2.8 | A | A | A | A | A | A |
| | 10 | 3.6 | 23.5 | 3.3 | A | A | A | A | A | A |
| | 11 | 4.1 | 5.1 | 4.3 | A | A | A | A | B | A |
| | 12 | 4.8 | 29.1 | 5.5 | B | A | A | B | B | B |
| | 13 | 4.0 | 18.1 | 3.1 | B | A | A | A | A | A |

TABLE 7

| | | Comparative example | | | | |
|---|---|---|---|---|---|---|
| | | 1 | 2 | 3 | 4 | 5 |
| Pigment dispersion | White pigment dispersion A | — | — | — | — | — |
| | Black pigment dispersion B | 20.0 | 20.0 | — | — | — |
| | Yellow pigment dispersion C | — | — | — | — | — |
| | Cyan pigment dispersion D | — | — | — | — | — |
| | Magenta pigment dispersion E | — | — | 20.0 | — | 20.0 |
| | Magenta pigment dispersion F | — | — | — | 20.0 | — |
| Monofunctional monomer | Trifluoroethyl acrylate (SP value: 6.8, saturation concentration of water: 0.5% by mass) | — | — | 5.0 | — | — |
| | Stearyl acrylate (SP value: 8.7, saturation concentration of water: 0.6% by mass) | 38.0 | 20.0 | — | — | — |
| | Isobornyl acrylate (SP value: 8.7, saturation concentration of water: 0.8% by mass) | — | — | — | — | 57.0 |
| | Lauryl acrylate (SP value: 8.9, saturation concentration of water: 0.7% by mass) | — | — | — | — | — |
| | Isoamyl acrylate (SP value: 9.0, saturation concentration of water: 0.7% by mass) | — | — | — | — | — |
| | Cyclic trimethylolpropane formal acrylate (SP value: 9.5, saturation concentration of water: 1.7% by mass) | — | — | 30.0 | — | — |
| | Cyclohexyl acrylate (SP value: 9.6, saturation concentration of water: 0.8% by mass) | — | — | — | — | — |
| | Benzyl acrylate (SP value: 10.1, saturation concentration of water: 0.9% by mass) | — | — | 30.0 | — | 8.0 |
| | Phenoxyethyl acrylate (SP value: 10.1, saturation concentration of water: 1.1% by mass) | 30.0 | 40.0 | — | — | — |
| | Acryloylmorpholine (SP value: 11.1, saturation concentration of water: 10% by mass or more) | — | — | — | 25.0 | — |
| | 4-hydroxybutyl acrylate (SP value: 11.8, saturation concentration of water: 10% by mass or more) | — | — | — | 38.0 | — |
| Multifunctional monomer | 1,9-nonanediol diacrylate (SP value: 9.8, saturation concentration of water: 1.1% by mass) | — | — | — | 5.0 | 3.0 |
| | Diethylene glycol diacrylate (SP value: 9.8, saturation concentration of water: 1.5% by mass) | — | 10.0 | 5.0 | — | — |

TABLE 7-continued

|  |  | Comparative example | | | | |
|---|---|---|---|---|---|---|
|  |  | 1 | 2 | 3 | 4 | 5 |
| | 1,6-hexanediol diacrylate (SP value: 10.0, saturation concentration of water: 1.2% by mass) | — | — | — | — | — |
| | Trimethylolpropane triacrylate (SP value: 10.4, saturation concentration of water: 1.8% by mass) | — | — | — | — | — |
| | Pentaerythritol triacrylate (SP value: 10.5, saturation concentration of water: 1.5% by mass) | — | — | — | — | — |
| Polymerizable oligomer | Urethane acrylic oligomer (Product name: CN986) | — | — | — | — | — |
| | Urethane acrylic oligomer (Product name: UV-3200B) | — | 6.0 | 6.0 | 5.0 | 7.0 |
| Polymerization initiator | bis(2,4,6-trimethylbenzoyl)-phenylphosphine oxide | 5.0 | — | — | — | — |
| | 2,4,6-trimethylbenzoyl-diphenyl-phospine oxide | 3.0 | — | — | — | — |
| | 2,4-diethylthioxanthone | 3.5 | — | — | — | — |
| | 2-benzyl-2-dimethylamino1-(4-morpholinophenyl)-butanone-1 | — | — | — | 6.5 | — |
| | 2-(dimethylamino)-2-[(4-methyl-phenyl)-methyl]-1-[4-(4-morpholinyl)phenyl]-1-butanone | — | 3.5 | 3.5 | — | 4.5 |
| Polymerization inhibitor | p-methoxyphenol | 0.2 | 0.2 | 0.2 | 0.2 | 0.2 |
| Surfactant | Polyether-modified polydimethylsiloxane | 0.3 | 0.3 | 0.3 | — | 0.3 |
| | Acrylic-functional-group-containing modified polydimethylsiloxane | — | — | — | 0.3 | — |
| | Total (% by mass) | 100 | 100 | 100 | 100 | 100 |
| | Tg of the cured film (° C.) | 9.6 | −3.4 | 22.4 | 53.8 | 74.5 |
| Evaluation results | Protective layer (laminate) adhesion | B | C | B | D | D |
| | Label substrate (paper) adhesion | B | C | B | D | D |
| | Label substrate (glass) adhesion | B | C | B | D | D |
| | Label substrate (metal) adhesion | B | C | B | D | D |
| | Water resistant adhesion | D | D | D | D | C |
| | Water discoloration resistance | D | B | D | D | B |
| | Water absorption rate of the cured film (% by mass) | 18.4 | 5.1 | 10.5 | 24.6 | 4.4 |

TABLE 8

|  |  |  | Monomer property | | Example | | | | |
|---|---|---|---|---|---|---|---|---|---|
|  |  |  | SP Value | Water content (%) | 6 | 7 | 8 | 9 | 10 |
| Pigment dispersion | | Type | | | A2 | F2 | C2 | C2 | A2 |
| | | Content (% by mass) | | | 20 | 20 | 20 | 20 | 20 |
| Polymerizable compound | Monofunctional monomer | Benzyl acrylate | 10.1 | 0.9 | 8 | | | | 30 |
| | | Cyclic tritmethylolpropane formal acrylate | 9.5 | 1.7 | | | | | 30 |
| | | Cyclohexyl acrylate | 9.6 | 0.8 | | | | | |
| | | Isoamyl acrylate | 9 | 0.7 | | | | | |
| | | Stearyl acrylate | 8.7 | 0.8 | | | | 20 | 38 |
| | | Lauryl acrylate | 8.9 | 0.7 | | | | | |
| | | 4-hydroxybutyl acrylate | 11.8 | 10 or more | | 38 | | | |
| | | Phenoxyethyl acrylate | 10.1 | 1 | | | | 40 | 35 |
| | | Acryloylmorpholine | 11.2 | 10 or more | | 25 | | | |
| | | Isobornyl acrylate | 8.7 | 0.8 | 57 | | | | |
| | | Trifluoroethyl acrylate | 6.8 | 0.5 | | | | | 5 |
| | Muitifunctional monomer | 1,9-nonanediol diacrylate | 9.8 | 1.1 | 3 | 5 | | | |
| | | 1,6-hexanediol diacrylate | 10 | 1.2 | | | | | |
| | | Diethylene glycol diacrylate | 9.8 | 1.9 | | | 10 | | 5 |
| | | Trimethylolpropane triacrylate | 10.4 | 1.8 | | | | | |
| | | Pentaerythritol triacrylate | 10.5 | 1.5 | | | | | |
| | Polyrnerizable oligomer | Urethane acrylic oligomer | | | 7 | 5 | 6 | | 6 |
| Polymerization initiator | | 2-(dimethylamino)-2-[(4-methyl-phenyl)-methyl]-1-[4-(4-morpholinyl)phenyl]-1-butanone | | | 4.5 | | 3.5 | | 3.5 |
| | | bis(2,4,6-trimethylbenzoyl)-phenylphosphine oxide | | | | | | 5 | |
| | | 2,4,6-trimethylbenzoyl-diphenyl-phosohine oxide | | | | | | 3 | |
| | | 2,4-diethylthioxanthone | | | | | | 3.5 | |
| | | 2-benzyl-2-dimethylamino1-(4-morpholinophenyl)-butanone-1 | | | | 6.5 | | | |

TABLE 8-continued

|  |  |  | Monomer property | | | | | |
|---|---|---|---|---|---|---|---|---|
|  |  |  |  | Water | Example | | | | |
|  |  | SP Value | content (%) | 6 | 7 | 8 | 9 | 10 |
| Polymerization inhibitor | p-methoxyphenol |  |  | 0.2 | 0.2 | 0.2 | 0.2 | 0.2 |
| Surfactant | Polyether-modified polydimethylsiloxane |  |  | 0.3 |  | 0.3 | 0.3 | 0.3 |
|  | Acrylic-functional-group-containing modified polydimethylsiloxane |  |  |  | 0.3 |  |  |  |
|  | Total (% by mass) |  |  | 100 | 100 | 100 | 100 | 100 |

TABLE 10

|  |  | Void area ratio of the cured film (%) | Tg of the cured film (° C.) | Water absorption rate of the cured film (%) | Water discoloration resistance | Water resistant adhesion | Laminate adhesion | Substrate adhesiom | | |
|---|---|---|---|---|---|---|---|---|---|---|
|  |  |  |  |  |  |  |  | TOPKOTE | Glass | Aluminum |
| Comparative Example | 6 | 5.8 | 74.5 | 3.1 | B | C | D | D | D | D |
|  | 7 | 25.6 | 53.8 | 24.6 | D | D | D | D | D | D |
|  | 8 | 6.5 | −3.4 | 5.1 | B | D | C | C | C | C |
|  | 9 | 14.2 | 9.6 | 18.4 | D | D | B | B | B | B |
|  | 10 | 10.2 | 22.4 | 10.5 | D | D | B | B | B | B |

It is understood that the curable compositions of Examples 1 to 6 (Table 3) are excellent in the protective layer (laminate) adhesion and the label substrate adhesion compared to the curable compositions of Comparative examples 1 to 5 (Table 7). Further, the curable compositions of Examples 1 to 6 (Table 3) have good water resistant adhesion, low water discoloration resistance, and low water absorption rate of the cured film compared to the curable compositions of Comparative examples 1 to 5 (Table 7).

Specifically, it is understood that Comparative example 1 which does not include a multifunctional monomer has numerous gaps in the network due to the cross-linked structure of the cured multifunctional monomer where water can easily enter, thus, the water resistance of the cured film decreases.

Further, it is understood that in Examples 1, 2 and 4 to 6 which contain at least one of cyclic trimethylolpropane formal acrylate, cyclohexyl acrylate, and benzyl acrylate, which are monofunctional monomers having a ring structure, the water absorption rate decreases, and the water resistance improves.

Therefore, the present disclosure can provide a curable composition having an excellent adhesion between a cured film and a protective layer or a label substrate, and excellent in water resistance.

Further, as is clear from the results of Table 6 that in the curable inkjet inks of Examples 7 to 13 comprising a multifunctional monomer, a monofunctional monomer, and 1% by mass to 5% by mass of a pigment relative to the total amount of the curable composition, and having a void area ratio calculated with the binarized image of the cryo SEM image immediately after the water resistance test of 5% or less, the water absorption rate is low, the discoloration by water is low, and the water resistant adhesion is good. Further, the adhesion with the laminate film when lamination processing was performed and the adhesiveness when used as a label by pasting a substrate on a printed surface are good, thus, both of these properties can be made compatible.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A curable composition comprising:
at least one monomer comprising a multifunctional monomer, each monomer having a solubility parameter of from 7 to 11 $(cal/cm^3)^{0.5}$,
wherein a cured film produced by curing the curable composition has a glass transition temperature of from 0° C. to 30° C., and has a water absorption rate represented by the following Formula (1) of 5% by mass or less:

$$\text{Water absorption rate of the cured film (\% by mass)} = \frac{\text{Mass of the cured film increased due to water absorption (g)}}{\text{Mass of the cured film prior to water absorption (g)}} \times 100. \quad \text{Formula (1)}$$

2. The curable composition according to claim 1, wherein each monomer has a saturation concentration of water of 3% by mass or less at 25° C.

3. The curable composition according to claim 1, further comprising at least one pigment dispersant, each pigment dispersant having a saturation concentration of water of 3% by mass or less at 25° C.

4. The curable composition according to claim 1, wherein the cured film has a void area ratio of 5% or less, the void area ratio calculated by binarizing a scanning electron microscope image of a cross-section of the cured film having an average thickness of 10 μm that has been immersed in water having a temperature of 40° C. for 24 hours, subsequently immersed in liquid nitrogen for at least two minutes to be frozen, transferred to a cryo stage, and processed by a focused ion beam.

5. The curable composition according to claim 4, further comprising a pigment in an amount of from 1% by mass to 5% by mass of the curable composition.

6. A curable ink comprising the curable composition according to claim 1.

7. A storing container comprising:
a container; and
the curable composition according to claim 1 stored in the container.

8. A two-dimensional or three-dimensional image forming device comprising:
a container storing the curable composition according to claim 1; and
an energy applicator configured to apply an energy to the curable composition to cure the curable composition.

9. The two-dimensional or three-dimensional image forming device according to claim 8, further comprising a discharger configured to discharge the curable composition by an inkjet recording method.

10. The two-dimensional or three-dimensional image forming device according to claim 8, wherein the energy applicator is a light emitting diode.

11. A two-dimensional or three-dimensional image forming method comprising:
applying an energy to the curable composition according to claim 1 to cure the curable composition to form a two-dimensional or three-dimensional image.

12. A cured product comprising:
a substrate; and
a cured layer on the substrate, the cured layer formed by curing the curable composition according to claim 1, wherein an adhesive force between the substrate and the cured layer is Class 1 or higher by a JIS K5600 cross-cut evaluation ranking.

13. A printed matter comprising:
a substrate;
a cured layer on the substrate, the cured layer formed by curing the curable composition according to claim 1; and
a protective layer on the cured layer,
wherein an adhesive force between the cured layer and the protective layer is Class 1 or higher by a JIS K5600 cross-cut evaluation ranking.

14. An adhesive label comprising:
a substrate; and
a cured layer on the substrate, the cured layer formed by curing the curable composition according to claim 1, wherein the cured layer is adhesive.

15. The adhesive label according to claim 14, wherein a surface of the substrate which is opposite to the other surface having the cured layer thereon has liquid repellency.

16. A curable composition comprising:
at least one monomer comprising a multifunctional monomer, each monomer having a solubility parameter of from 7 to 11 $(cal/cm^3)^{0.5}$,
wherein a cured film produced by curing the curable composition has a glass transition temperature of from 0° C. to 30° C., and has a void area ratio of 5% or less, the void area ratio calculated by binarizing a scanning electron microscope image of a cross-section of the cured film having an average thickness of 10 μm that has been immersed in water having a temperature of 40° C. for 24 hours, subsequently immersed in liquid nitrogen for at least two minutes to be frozen, transferred to a cryo stage, and processed by a focused ion beam.

17. The curable composition according to claim 16, further comprising a pigment in an amount of from 1% by mass to 5% by mass of the curable composition.

18. The curable composition according to claim 16, wherein each monomer has a saturation concentration of water of 3% by mass or less at 25° C.

19. The curable composition according to claim 16, further comprising at least one pigment dispersant, each pigment dispersant having a saturation concentration of water of 3% by mass or less at 25° C.

20. A two-dimensional or three-dimensional image forming device comprising:
a container storing the curable composition according to claim 16; and
an energy applicator configured to apply an energy to the curable composition to cure the curable composition.

* * * * *